(12) United States Patent
Kashitani

(10) Patent No.: US 11,062,170 B2
(45) Date of Patent: Jul. 13, 2021

(54) INFORMATION PROCESSING APPARATUS, INFORMATION PROCESSING METHOD, AND IMAGING APPARATUS

(71) Applicant: SONY CORPORATION, Tokyo (JP)

(72) Inventor: Tatsuki Kashitani, Tokyo (JP)

(73) Assignee: SONY CORPORATION, Tokyo (JP)

( * ) Notice: Subject to any disclaimer, the term of this patent is extended or adjusted under 35 U.S.C. 154(b) by 38 days.

(21) Appl. No.: 16/479,378

(22) PCT Filed: Dec. 1, 2017

(86) PCT No.: PCT/JP2017/043308
§ 371 (c)(1),
(2) Date: Jul. 19, 2019

(87) PCT Pub. No.: WO2018/150683
PCT Pub. Date: Aug. 23, 2018

(65) Prior Publication Data
US 2019/0385006 A1    Dec. 19, 2019

(30) Foreign Application Priority Data

Feb. 15, 2017    (JP) .............................. JP2017-025803

(51) Int. Cl.
*H04N 5/232*    (2006.01)
*G06K 9/46*    (2006.01)

(52) U.S. Cl.
CPC ....... *G06K 9/4661* (2013.01); *H04N 5/23229* (2013.01)

(58) Field of Classification Search
CPC .................................................. H04N 5/23229
(Continued)

(56) References Cited

U.S. PATENT DOCUMENTS 10,438,365 B2 * 10/2019 Myokan ............... H04N 5/3696
2014/0092227 A1 * 4/2014 Kanamori ............... A61B 1/07
348/68
(Continued)

FOREIGN PATENT DOCUMENTS

CN        105814607 A    7/2016
CN        107251539 A    10/2017
(Continued)

OTHER PUBLICATIONS

International Search Report and Written Opinion of PCT Application No. PCT/JP2017/043308, dated Feb. 6, 2018, 10 pages of ISRWO.
(Continued)

*Primary Examiner* — Joel W Fosselman
(74) *Attorney, Agent, or Firm* — Chip Law Group

(57) ABSTRACT

A filter section uses pixel signals of a polarization image generated by an imaging section, in which polarization pixels with a plurality of polarization directions are provided in a predetermined array, to perform a filter process of the image signals arranged in a polarization order in a predetermined rotation direction to extract polarization components. Further, in the imaging section, the polarization pixels with the plurality of polarization directions may be provided in a polarization order of a predetermined rotation direction in at least one of the horizontal direction or the vertical direction. The filter section can acquire polarization components, which vary in response to a polarization cycle, with high accuracy from the polarization image generated by the imaging section.

11 Claims, 27 Drawing Sheets

(58) Field of Classification Search
USPC .................................................... 348/222.1
See application file for complete search history.

(56) References Cited

U.S. PATENT DOCUMENTS

| | | |
|---|---|---|
| 2016/0267348 A1 | 9/2016 | Kondo |
| 2016/0269694 A1 | 9/2016 | Masuda et al. |

FOREIGN PATENT DOCUMENTS

| | | |
|---|---|---|
| EP | 2889807 A2 | 7/2015 |
| EP | 3086282 A1 | 10/2016 |
| JP | 2004-299443 A | 10/2004 |
| JP | 2011-154695 A | 8/2011 |
| JP | 5603508 B2 | 10/2014 |
| JP | 2015-115041 A | 6/2015 |
| JP | 2015-144421 A | 8/2015 |
| JP | 2016-171368 A | 9/2016 |
| JP | 2017-017563 A | 1/2017 |
| WO | 2013/175686 A1 | 11/2013 |
| WO | 2015/093206 A1 | 6/2015 |
| WO | 2016/136086 A1 | 9/2016 |
| WO | 2017/002715 A1 | 1/2017 |

OTHER PUBLICATIONS

Extended European Search Report of EP Application No. 17896708.9, dated Jan. 28, 2020, 13 pages.

\* cited by examiner

FIG. 7A

2 PIXELS

| Z1 | W1 | Z2 | W2 | Z3 | W3 |
| Y1 | X1 | Y2 | X2 | Y3 | X3 |
| Z4 | W4 | Z5 | W5 | Z6 | W6 |
| Y4 | X4 | Y5 | X5 | Y6 | X6 |
| Z7 | W7 | Z8 | W8 | Z9 | W9 |
| Y7 | X7 | Y8 | X8 | Y9 | X9 |

REORDERING

FILTER PROCESS ORDER →

| W1 | X1 | Y1 | Z1 | W2 | X2 | Y2 | Z2 | W3 | X3 | Y3 | Z3 |
| W4 | X4 | Y4 | Z4 | W5 | X5 | Y5 | Z5 | W6 | X6 | Y6 | Z6 |
| W7 | X7 | Y7 | Z7 | W8 | X8 | Y8 | Z8 | W9 | X9 | Y9 | Z9 |

FIG. 7B

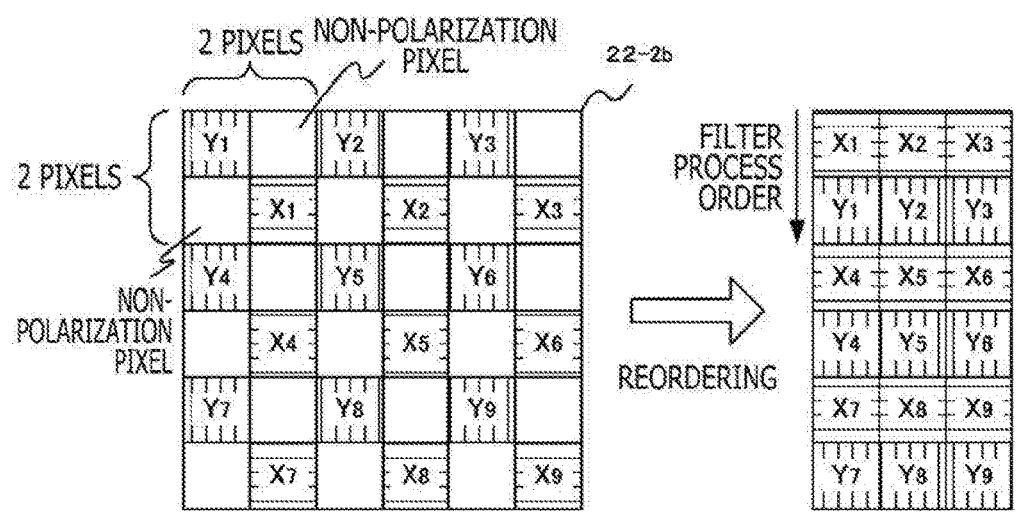
FIG. 14A
FIG. 14C
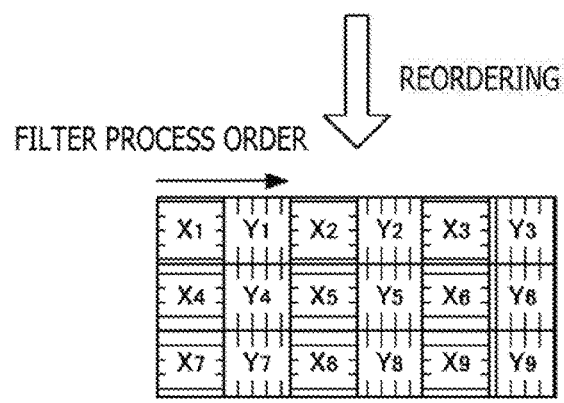
FIG. 14B

INFORMATION PROCESSING APPARATUS, INFORMATION PROCESSING METHOD, AND IMAGING APPARATUS

CROSS REFERENCE TO RELATED APPLICATIONS

This application is a U.S. National Phase of International Patent Application No. PCT/JP2017/043308 filed on Dec. 1, 2017, which claims priority benefit of Japanese Patent Application No. JP 2017-025803 filed in the Japan Patent Office on Feb. 15, 2017. Each of the above-referenced applications is hereby incorporated herein by reference in its entirety.

TECHNICAL FIELD

The present technology relates to an information processing apparatus, an information processing method, a program and an imaging apparatus and makes it possible to acquire polarization information from a polarization image with high accuracy.

BACKGROUND ART

Conventionally, it is practiced to use an imaging apparatus that can acquire polarization information to perform identification and so forth of a shape or a state of an object. Further, it is practiced to remove noise from polarization information such that processing using polarization information can be performed with high accuracy. For example, according to PTL 1, calculation of a polarization ratio intensity between a vertical polarization image and a horizontal polarization image is performed, and every time a polarization ratio intensity is calculated, noise removal is performed by arithmetic operation of a moving average intensity corresponding to an average within a predetermined period of time series data of the polarization ratio intensity. Further, the predetermined period is adjusted in response to the traveling speed of a vehicle to perform decision of a road surface state on the basis of the moving average intensity after noise removal. In PTL 2, a noise removing parameter corresponding to a specified road surface state is used to perform noise removal from polarization information (polarization image) acquired by an imaging apparatus.

CITATION LIST

Patent Literature

[PTL 1]
Japanese Patent Laid-open No. 2004-299443
[PTL 2]
Japanese Patent Laid-open No. 2011-154695

SUMMARY

Technical Problem

Incidentally, in the case where noise removal is performed by arithmetic operation of the moving average intensity corresponding to an average within a predetermined period, time series data are required, and, for example, in the case where polarization information acquired is information only at one point of time, noise cannot be removed. Further, in the case where noise removal is performed using a noise removing parameter corresponding to the road surface state, noise cannot be removed if the road surface state is not specified correctly.

Therefore, it is an object of the present technology to provide an information processing apparatus, an information processing method, a program and an imaging apparatus by which polarization information can be acquired with high accuracy from a polarization image.

Solution to Problem

The first aspect of the present technology resides in
an information processing apparatus including a filter processing section configured to use pixel signals of a polarization image generated by an imaging apparatus in which polarization pixels with a plurality of polarization directions are provided in a given array to extract polarization components by a filter process of the pixel signals arranged in a polarization order in a given rotation direction.

In the present technology, pixel signals of a polarization image generated by the imaging apparatus in which the polarization pixels with the plurality of polarization directions are provided in the given array are rearranged into an array in which, for example, a horizontal direction or a vertical direction is the polarization order in the given rotation direction by a reordering section. The filter processing section performs the filter process for extracting signal components of a polarization cycle as polarization components from the rearranged pixel signals. An array restoration section returns the filter processed pixel signals, namely, the pixel signals indicative of the polarization components, into an array before the rearrangement is performed by the reordering section.

Further, the reordering section performs rearrangement of pixel signals of a polarization image generated by the imaging apparatus into an array in which one of the horizontal direction or the vertical direction is the polarization order in the given rotation direction and rearrangement of the pixel signals filter processed by the filter processing section into an array in which the other of the horizontal direction or the vertical direction is the polarization order in the given rotation direction. The filter processing section performs the filter process using the pixel signals for which the rearrangement in the one direction is performed by the reordering section and the filter process using the pixel signals for which the rearrangement in the other direction is performed by the reordering section.

Further, in the case where the imaging apparatus repetitively provides pixel blocks including polarization pixels with the plurality of polarization directions such that the polarization pixels with the plurality of polarization directions are arranged in the given array, the reordering section rearranges the pixel signals in the pixel block into an array in which the horizontal direction or the vertical direction is the polarization order in the given rotation direction. Further, in the case where the imaging apparatus has polarization pixels with the plurality of polarization directions and non-polarization pixels, the reordering section rearranges the pixel signals of the polarization pixels except the pixel signals of the non-polarization pixels into an array in which the horizontal direction or the vertical direction is the polarization order in the given rotation direction.

Furthermore, in the case where the imaging apparatus includes polarization pixels that have four polarization directions having angular differences equal to each other therebetween and are provided in the given array, the reordering section rearranges the pixel signals of the polarization image generated by the imaging apparatus into an array in which the horizontal direction or the vertical direction is the polarization order in the given rotation direction and then distributes the pixel signals alternately for each pixel to generate two pixel signal groups, and the filter processing section performs the filter process for each of the pixel signal groups generated by the reordering section.

The second aspect of the present technology resides in an information processing method including using pixel signals of a polarization image generated by an imaging apparatus in which polarization pixels with a plurality of polarization directions are provided in a given array to extract polarization components by a filter processing section performing a filter process of the pixel signals arranged in a polarization order in a given rotation direction.

The third aspect of the present technology resides in a program for causing a computer to execute signal processing of pixel signals of a polarization image generated by an imaging apparatus in which polarization pixels with a plurality of polarization directions are provided in a given array, in which the program causes the computer to execute a procedure for extracting polarization components by a filter process of the pixel signals arranged in a polarization order in a given rotation direction.

It is to be noted that the program of the present technology is a program that can be provided, for example, to a computer for universal use that can execute various program codes, by a storage medium or a communication medium that provides the program in a computer-readable form, for example, by a storage medium such as an optical disk, a magnetic disk, a semiconductor memory or the like or by a communication medium such as a network. By providing such a program as described above in a computer-readable form, processes according to the program are implemented on a computer.

The fourth aspect of the present technology resides in an imaging apparatus, in which polarization pixels with a plurality of polarization directions are provided in a polarization order in a given rotation direction in at least one of a horizontal direction or a vertical direction.

In the present technology, the polarization pixels with the plurality of polarization directions are provided in the polarization order in the given rotation direction in at least one of the horizontal direction or the vertical direction, and, for example, polarization angular differences between the polarization pixels arranged in the polarization order are set equal to each other. Further, in the imaging apparatus, a polarization pixel group adjacent to a polarization pixel group in which the image signals are arranged in the polarization order of the given rotation direction in the horizontal direction or the vertical direction may be provided so as to have a polarization order in an opposite rotation direction to the given rotation direction.

Advantageous Effects of Invention

According to the present technology, pixel signals of a polarization image generated by an imaging apparatus in which polarization pixels with a plurality of polarization directions are provided in a given array are used to extract polarization components by a filter process of the image signals arranged in a polarization order in a given rotation direction. Therefore, polarization information indicative of polarization components that vary in response to a polarization cycle can be acquired with high accuracy from the polarization image. It is to be noted that the advantageous effect described in the present specification is exemplary to the last and is not restrictive, and some additional advantageous effects may be applicable.

BRIEF DESCRIPTION OF DRAWINGS

FIGS. 7A and 7B are views illustrating horizontal reordering operation.

FIGS. 14A, 14B, and 14C are views exemplifying another pixel array (in the case of two polarization directions) of the imaging section in the second embodiment.

DESCRIPTION OF EMBODIMENTS

In the following, modes for carrying out the present technology are described. It is to be noted that the description is given in the following order.
1. Polarization Information
2. Configuration of Polarization Information Acquisition System
3. First Embodiment
4. Second Embodiment
5. Third Embodiment
6. Fourth Embodiment
7. Fifth Embodiment
8. Other Embodiments
9. Application Examples

1. Polarization Information

Figure 1:
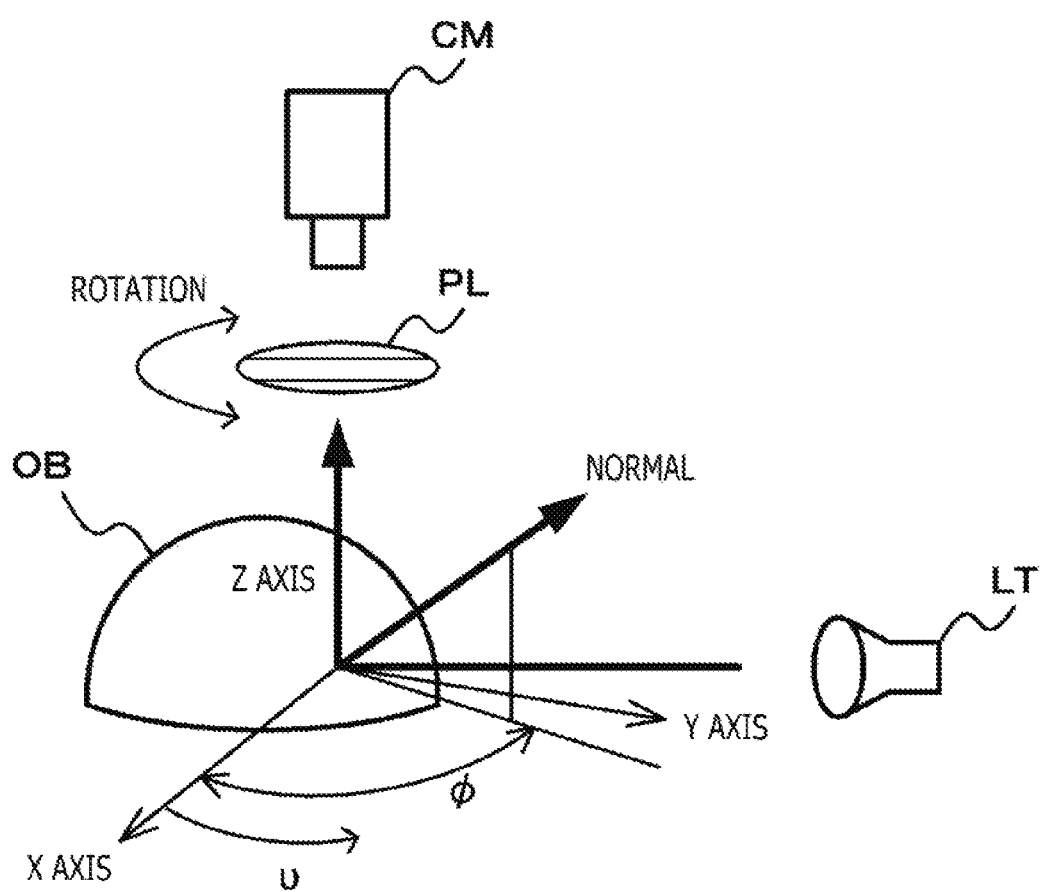
FIG. 1 is a view illustrating operation in the case where polarization information is acquired.
Figure 2:
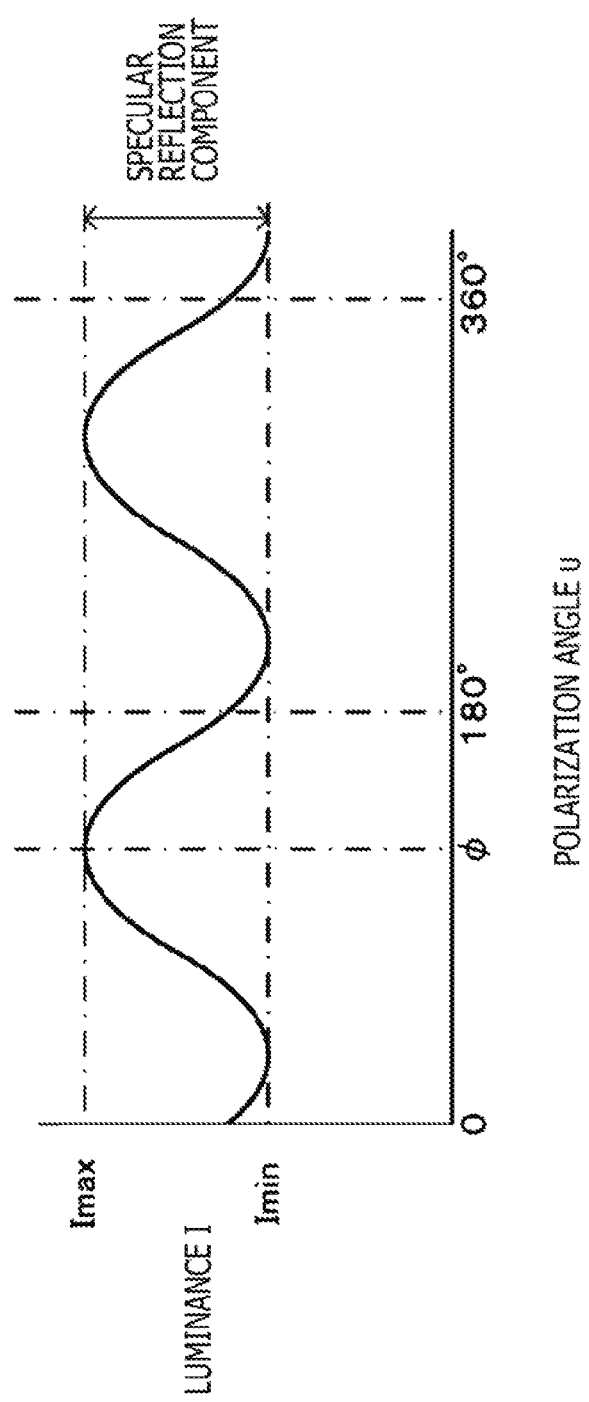
FIG. 2 is a view exemplifying a relationship between the luminance and the polarization angle.

FIG. 1 is a view illustrating operation in the case where polarization information is acquired. As depicted in FIG. 1, illumination of an imaging object OB is performed using a light source (non-polarization light source) LT such that the imaging object OB is imaged by an imaging section CM through a polarization plate PL. In this case, it is known that, in a polarization image generated by the imaging section CM, the luminance of the imaging object OB varies in response to rotation of the polarization plate PL. Here, the highest luminance and the lowest luminance when the polarization plate PL is rotated are represented by Imax and Imin, respectively. Further, when an x axis and a y axis in a two-dimensional coordinate system extend in a plane direction of the polarization plate PL, the angle on the xy plane with respect to the x axis when the polarization plate P1 is rotated is represented as polarization angle v. The polarization plate PL has a cycle of 180 degrees such that it returns to an original polarization state if it is rotated by 180 degrees. Here, if the polarization angle v when the maximum luminance Imax is observed is represented as azimuth $\varphi$, then the luminance I observed when the polarization plate PL is rotated can be represented by the expression (1). Further, the relationship between the luminance and the polarization angle is such as depicted, for example, in FIG. 2, and specular reflection components indicate a variation in cosine law according to a polarization cycle.

[Math. 1]

$$I = \frac{I_{max} + I_{min}}{2} + \frac{I_{max} - I_{min}}{2}\cos(2v + 2\phi) \quad (1)$$

Accordingly, in the information processing apparatus of the present technology, a filter process is performed utilizing that the variation in cosine law of the specular reflection components indicates a characteristic represented by the expression (1), and then, even if noise or a pixel failure occurs with the polarization image, polarization information indicative of specular reflection components is acquired with high accuracy.

2. Configuration of Polarization Information Acquisition System

Figure 3:
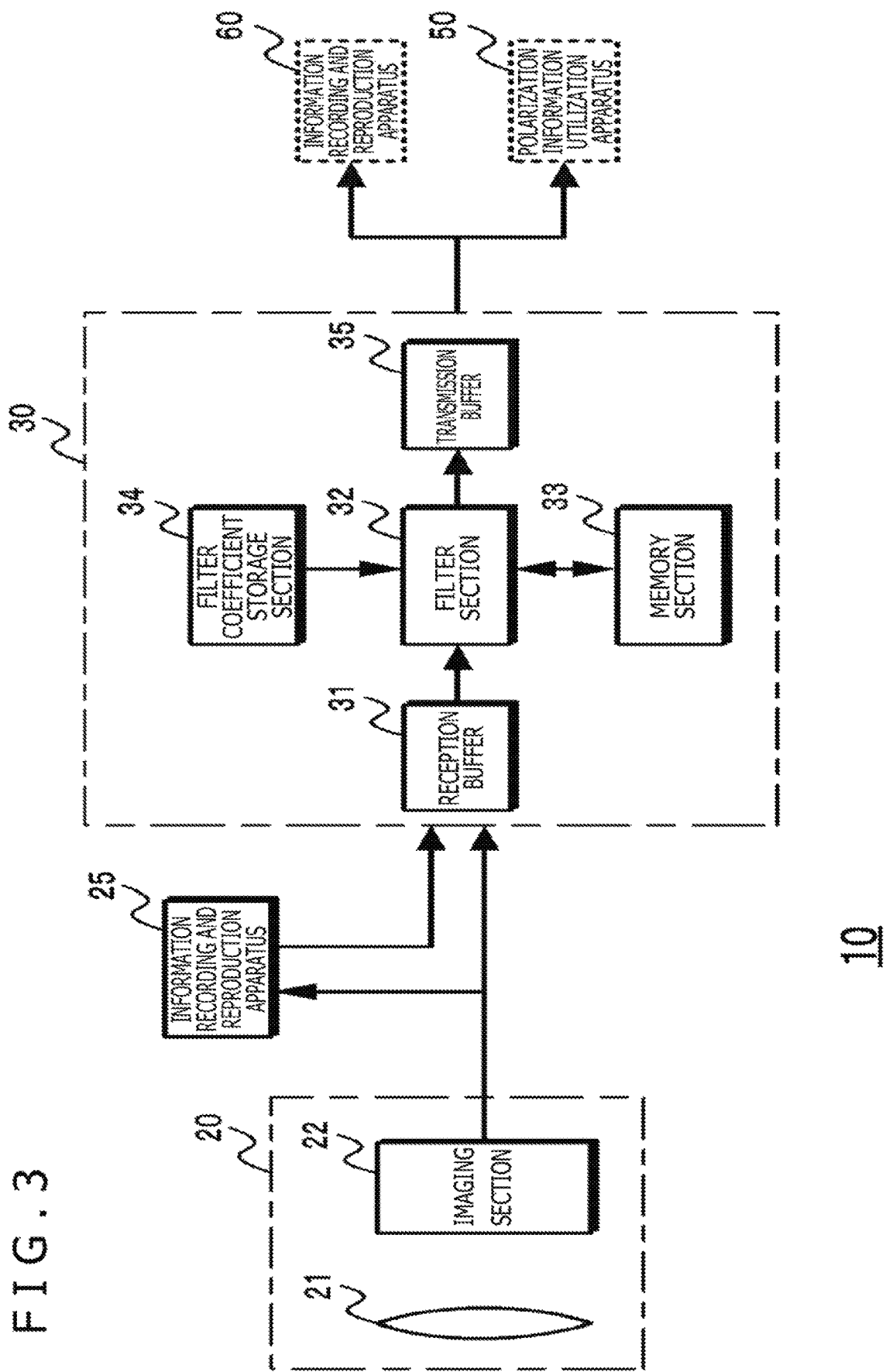
FIG. 3 is a view exemplifying a configuration of a polarization information acquisition system in which an information processing apparatus and an imaging apparatus are used.

FIG. 3 exemplifies a configuration of a polarization information acquisition system in which the information processing apparatus and the imaging apparatus of the present technology are used. In the polarization information acquisition system 10, a polarization camera 20 and an information processing apparatus 30 may be configured separately from each other or may be configured integrally. Further, the polarization camera 20 and the information processing apparatus 30 may be configured such that a polarization image generated by the polarization camera 20 is supplied to the information processing apparatus 30 through not only a transmission line but also a recording medium or the like.

Figure 4A:
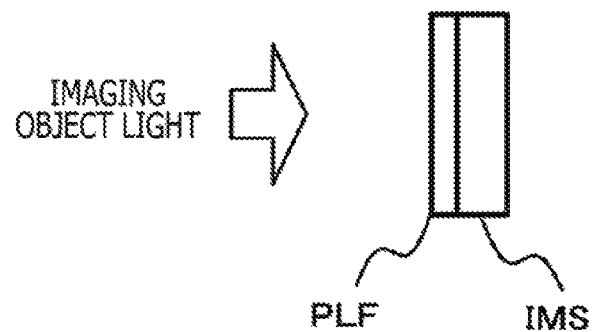
FIGS. 4A and 4B are views exemplifying a configuration of an imaging section.
Figure 4B:
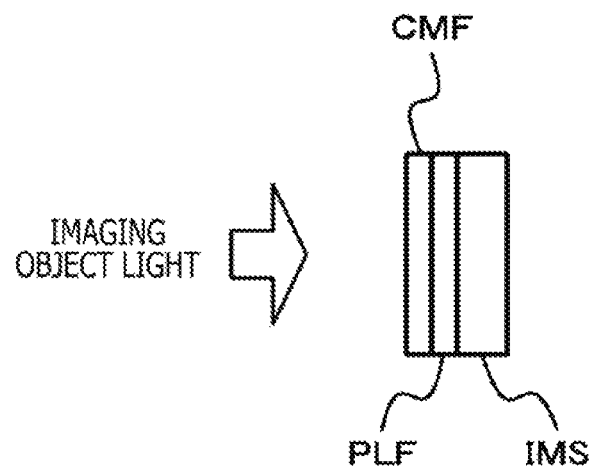

The polarization camera 20 includes an imaging optical system 21 and an imaging section 22 that is equivalent to the imaging apparatus of the present technology. The imaging optical system 21 introduces imaging object light to an imaging face of the imaging section 22. In the imaging section 22, polarization pixels with a plurality of polarization directions (polarization angles) are provided as a predetermined array such that a polarization image is generated. FIGS. 4A and 4B illustrate a configuration of the imaging section. As depicted in FIG. 4A, the imaging section 22 is configured such that a polarization filter PLF is disposed on an incidence face of an image sensor IMS and, in regard to pixels of the image sensor IMS, polarization pixels with a plurality of polarization directions are provided in a predetermined array. Alternatively, as depicted in FIG. 4B, the imaging section 22 may be configured otherwise such that a polarization filter PLF and a color mosaic filter CFL are disposed on an incidence face of an image sensor IMS such that pixels of the image sensor IMS are polarization pixels for individual different color components. The polarization camera 20 outputs pixel signals of a polarization image generated by the imaging section 22 to an information recording and reproduction apparatus 25 and the information processing apparatus 30.

The information recording and reproduction apparatus 25 is configured using a recording medium and records a polarization image generated by the polarization camera 20 into a recording medium. Further, the information recording and reproduction apparatus 25 reads out and outputs the polarization image recorded in the recording medium to the information processing apparatus 30. It is to be noted that the recording medium may be provided fixedly in the information recording and reproduction apparatus 25 or may be provided removably.

The information processing apparatus 30 includes a filter section 32, a memory section 33 and a filter coefficient storage section 34. Further, the information processing apparatus 30 may include a reception buffer 31 and a transmission buffer 35.

The reception buffer 31 of the information processing apparatus 30 temporarily stores a polarization image outputted from the polarization camera 20 or the information recording and reproduction apparatus 25. By temporarily storing the polarization image, the reception buffer 31 performs a filter process of the polarization image even in the case where time is required for a process in the information processing apparatus 30 in comparison with that for acquisition of a polarization image from the polarization camera 20 or the information recording and reproduction apparatus 25 or in the case where a process is performed using pixel signals of a polarization image in an order different from the pixel order of the polarization image.

The filter section 32 performs a filter process of pixel signals in a polarization order in a predetermined rotation direction to extract polarization components using the pixel signals of the polarization image stored in the reception buffer 31. In particular, the filter section 32 performs filter operation for extracting signal components that vary in response to a polarization cycle, namely, signal components with which a variation in cosine law according to a polarization cycle occurs, using pixel signals arranged in the polarization order in the predetermined rotational direction and filter coefficients stored in the filter coefficient storage section 34. By performing such a filter process as just described, the filter section 32 extracts polarization components with high accuracy even if noise, a pixel failure or the like occurs with the polarization image. The filter section 32 outputs polarization information indicative of the polarization components extracted by performing the filter process to the transmission buffer 35. It is to be noted that the filter section 32 performs a filter operation process and rearrangement of the pixel signals utilizing the memory section 33.

The transmission buffer 35 of the information processing apparatus 30 temporarily stores polarization information outputted from the filter section 32. The transmission buffer 35 temporarily stores the polarization information after the filter process to achieve utilization or recording of the polarization information in an order of a predetermined array even in the case where time is required for processing in a polarization information utilization section 50 or an information recording and reproduction apparatus 60 in comparison with the filter process in the information processing apparatus 30 or in the case where polarization information for the individual pixels after the filtering process is different from that of the predetermined array.

3. First Embodiment

Figure 5:
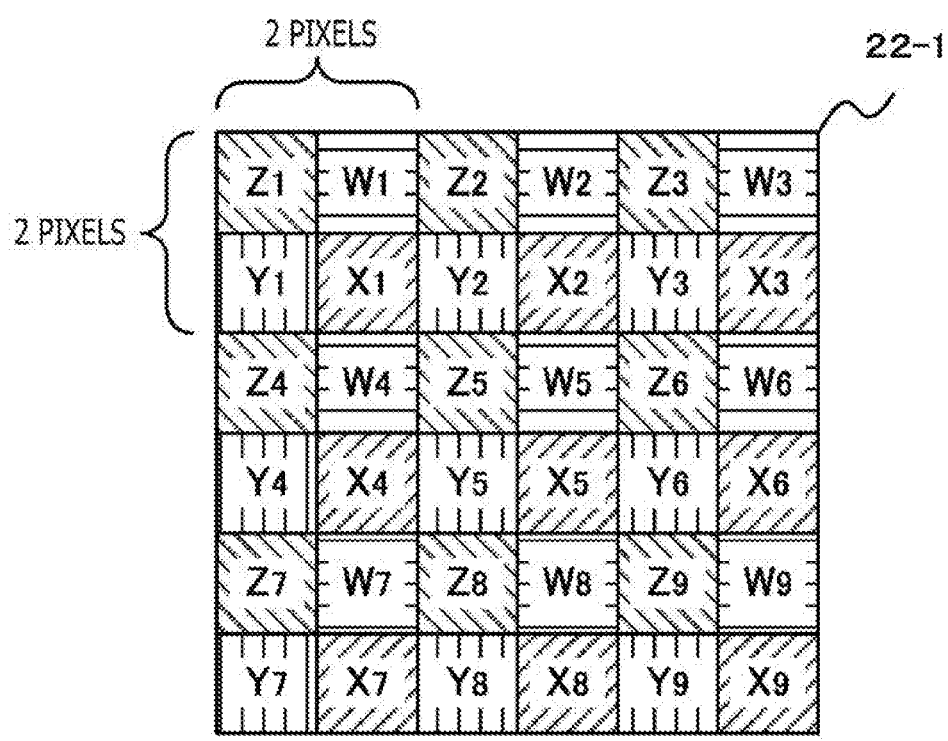
FIG. 5 is a view exemplifying a pixel array of an imaging section in a first embodiment.

Now, a first embodiment is described. FIG. 5 exemplifies a pixel array of an imaging section in the first embodiment. In the imaging section 22-1, pixel blocks including polarization pixels with a plurality of polarization directions are repetitively provided such that the polarization pixels with the plurality of polarization directions are arranged in a predetermined array. For example, the polarization pixels have four polarization directions different from each other, and, in a pixel block of 2×2 pixels, polarization pixels having polarization directions different from each other are provided and such pixel blocks are provided repetitively. Further, for example, the four polarization directions have angles the angular differences between which are equal to each other (45 degrees), and the polarization direction of a polarization pixel W is 0 degree; the polarization direction of a polarization pixel X is 45 degrees; the polarization direction of a polarization pixel Y is 90 degrees; and the polarization direction of a polarization pixel Z is 135 degrees. It is to be noted that, for simplification of the description, the embodiments of the present specification are described while illustrating a pixel region of 6×6 pixels that is part of a pixel region in the imaging section.

A filter section 32-1 of the information processing apparatus 30 in the first embodiment performs a filter process for pixel signals of a polarization image generated by the imaging section 22-1 in a polarization order in a predetermined rotation direction of pixel signals of the polarization pixels in the pixel block to generate polarization information indicative of specular reflection components.

Figure 6:
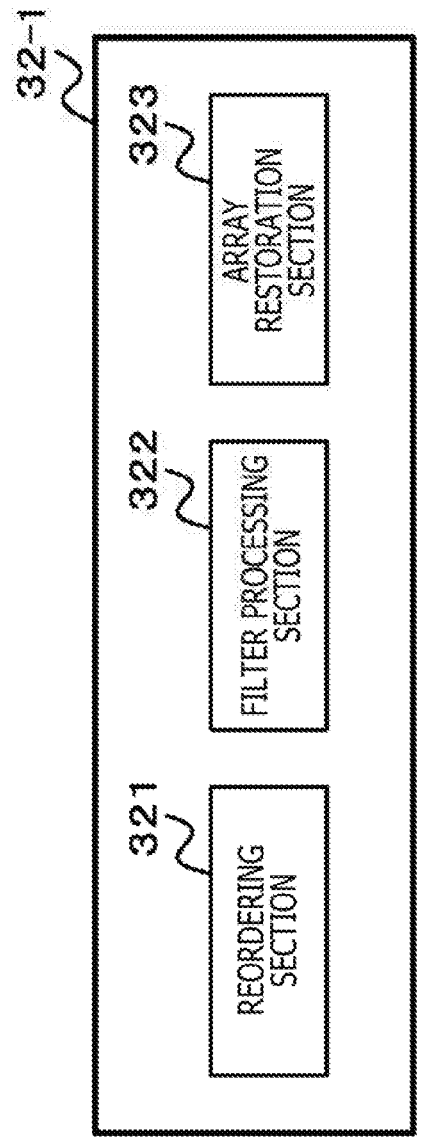
FIG. 6 is a view exemplifying a functional configuration of a filter section in the first embodiment.

FIG. 6 exemplifies a functional configuration of the filter section in the first embodiment. The filter section 32-1 includes a reordering section 321, a filter processing section 322 and an array restoration section 323.

The reordering section 321 rearranges pixel signals in a pixel block to an array in which the pixel signals have a polarization order in a predetermined rotational direction in the horizontal direction or the vertical direction.

The filter processing section 322 performs a band pass filter process using pixel signals arranged into the polarization order in the predetermined rotation direction by the reordering section 321 and filter coefficients stored in the filter coefficient storage section 34 to extract signal components that vary in response to a polarization cycle.

The array restoration section 323 performs an array restoration process in which pixel signals after the filter process by the filter processing section 322 are returned to an original array before rearrangement by the reordering section 321 is performed. It is to be noted that the function of the array restoration section 323 may be provided on the transmission buffer 35 such that the pixel signals after the filtering process are outputted in the order of the array before rearrangement is performed.

Now, operation of the filter section 32-1 is described. FIGS. 7A and 7B are views illustrating reordering operation in the horizontal direction. The reordering section 321 reorders pixel signals of a pixel block of 2×2 pixels depicted in FIG. 7A into a horizontal direction. As depicted in FIG. 7B, the reordering section 321 performs, in the reordering in the horizontal direction, reordering to pixel signals of a pixel block of 1×4 pixels having a polarization order in a predetermined rotation direction (for example, in a polarization order in a rotation direction in which the polarization angle increases). In particular, pixel signals of a pixel block of 2×2 pixels configured from polarization pixels W1, X1, Y1 and Z1 is reordered to pixel signals of a pixel block of 1×4 pixels having the order of the polarization pixels W1, X1, Y1 and Z1. Further, pixel signals of a pixel block of 2×2 pixels configured from polarization pixels W2, X2, Y2 and Z2 is reordered to pixel signals of a pixel block of 1×4 pixels having the order of the polarization pixels W2, X2, Y2 and Z2. Thereafter, pixel signals of each pixel block of 2×2 pixels are reordered to pixel signals of a pixel block of 1×4 pixels having a polarization order in the predetermined rotational direction.

The filter processing section 322 performs a band pass filter process of pixel signals after the reordering in the horizontal direction has been performed by the reordering section 321 to extract signal components that vary in response to a polarization cycle. In particular, the filter processing section 322 performs filter operation using the pixel signals for which the reordering in the horizontal direction has been performed by the reordering section 321 and the filter coefficients stored in the filter coefficient storage section 34 to extract signal components with which a variation in cosine law occurs.

Figure 8:
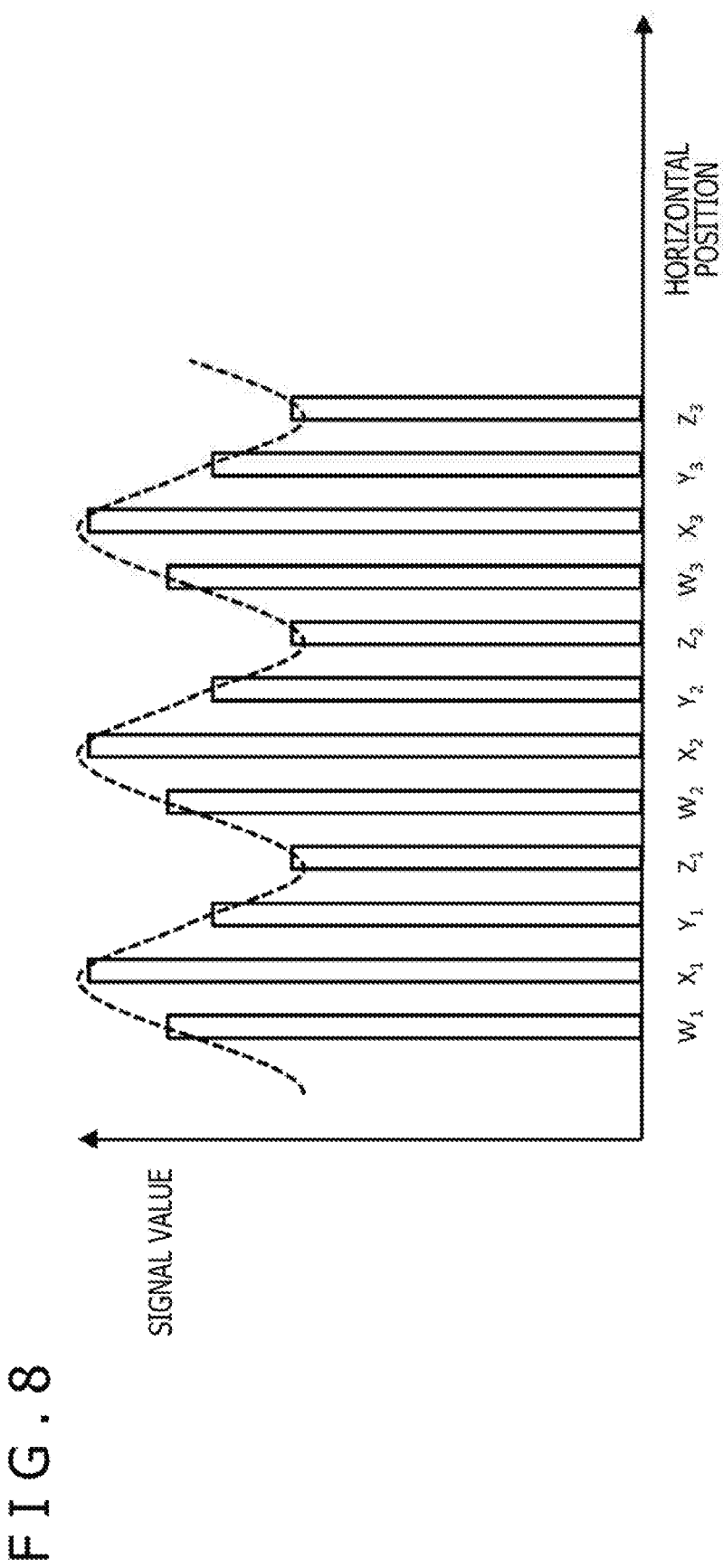
FIG. 8 is a view exemplifying pixel signals after horizontal reordering.

FIG. 8 exemplifies the pixel signals after the reordering in the horizontal direction. If pixel signals generated by the imaging section 22-1 are reordered to pixel signals of pixel blocks of 1×4 pixels having a polarization order in a predetermined rotational direction, then pixel signals after reordering in the horizontal direction have a characteristic that they can be approximated by the expression (1) as in the case described with reference to FIGS. 1 and 2.

Figure 9:
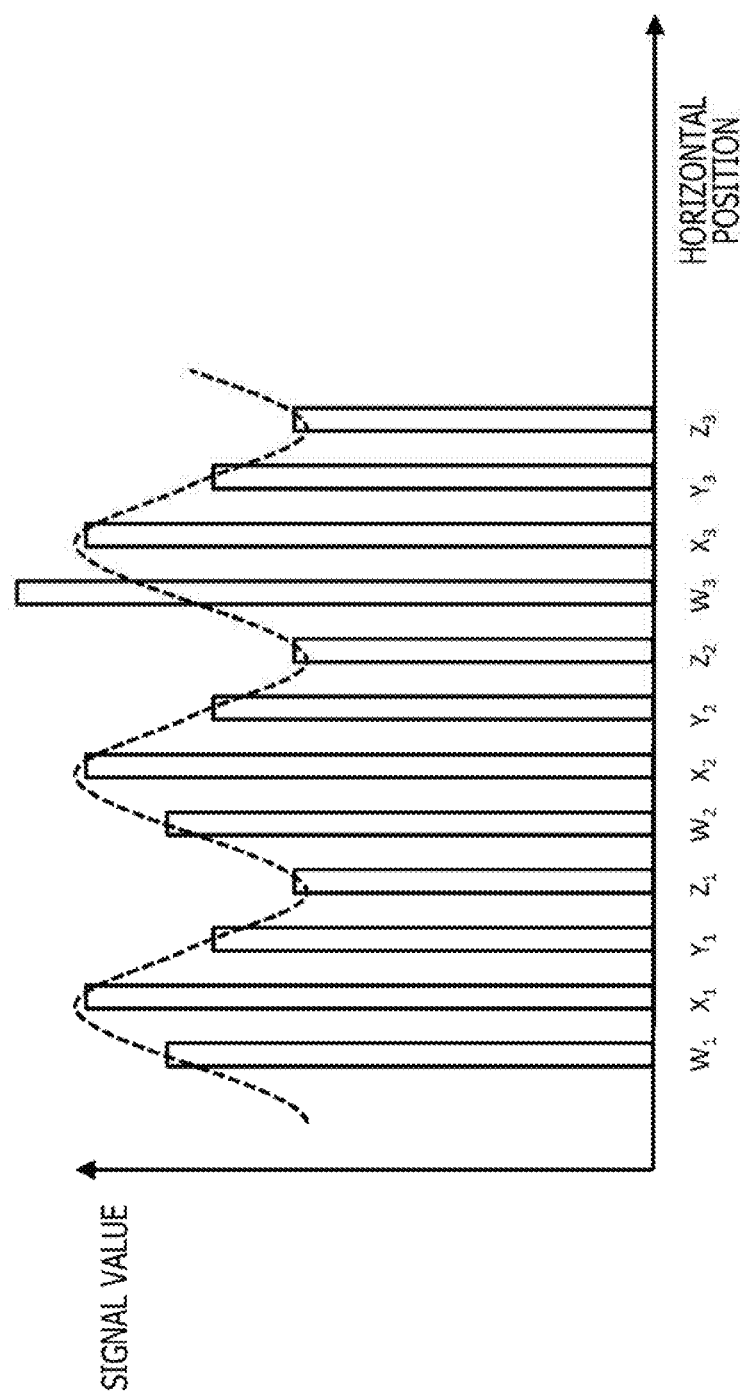
FIG. 9 is a view exemplifying pixel signals in the case where noise is superimposed.

FIG. 9 exemplifies pixel signals in the case where noise is superimposed. It is to be noted that FIG. 9 depicts a case in which noise is superimposed on pixel signals of the polarization pixel W3. In the pixel signals after reordering in the horizontal direction, pixel signals on which noise is superimposed indicate that the signal level is displaced from a characteristic that can be approximated by the expression (1). Accordingly, the filter processing section 322 performs a band pass filter process to extract signal components that indicate a variation in cosine law.

Figure 10:
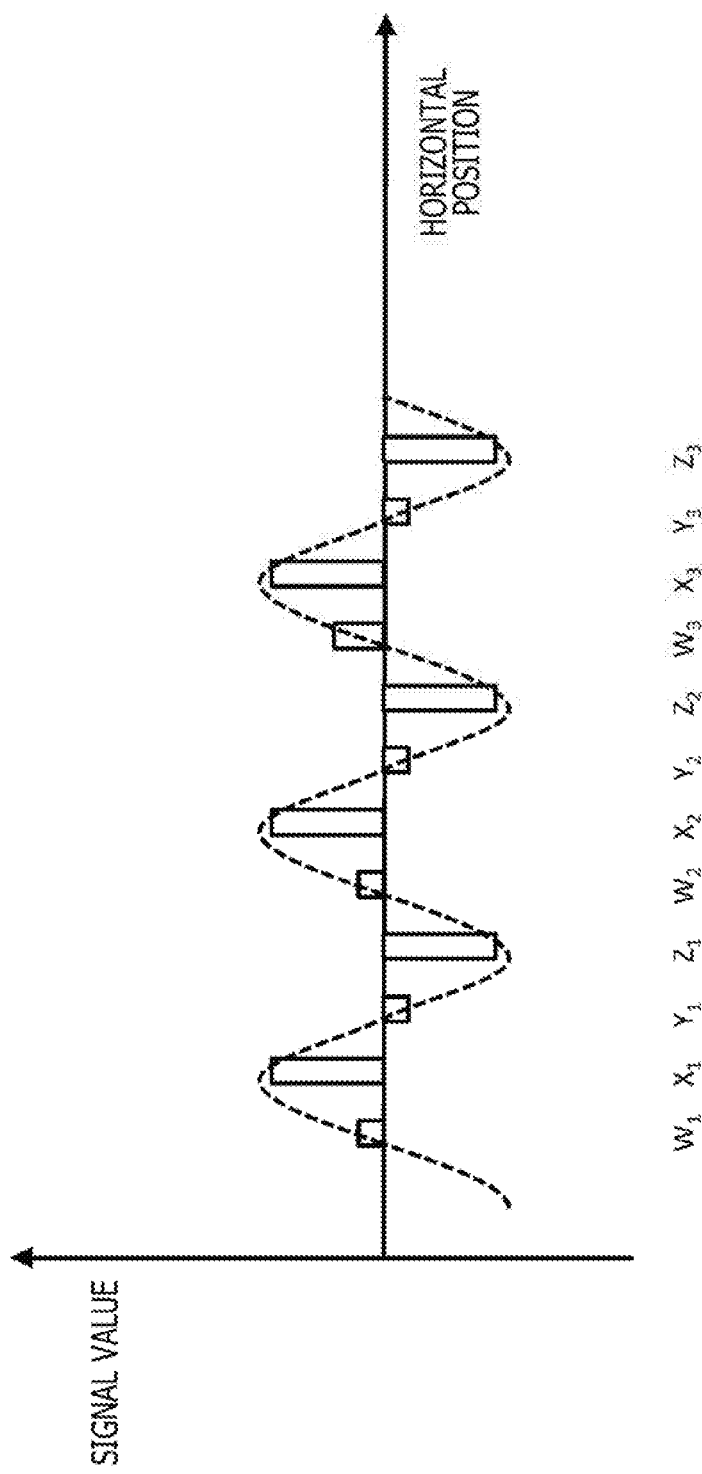
FIG. 10 is a view exemplifying pixel signals after filter processing.

FIG. 10 exemplifies pixel signals after a filter process. The filter processing section 322 extracts signal components that indicate a variation in cosine law from pixel signals after reordering in the horizontal direction by a band pass filter process.

It is to be noted that, although FIG. 9 exemplifies a case in which noise is superimposed, also in the case where pixel signals according to polarization components are not generated due to a pixel failure or the like, by performing the similar band pass filter process, such signal components that indicate a variation in cosine law as depicted in FIG. 10 can be extracted.

Figures 11A, 11B:
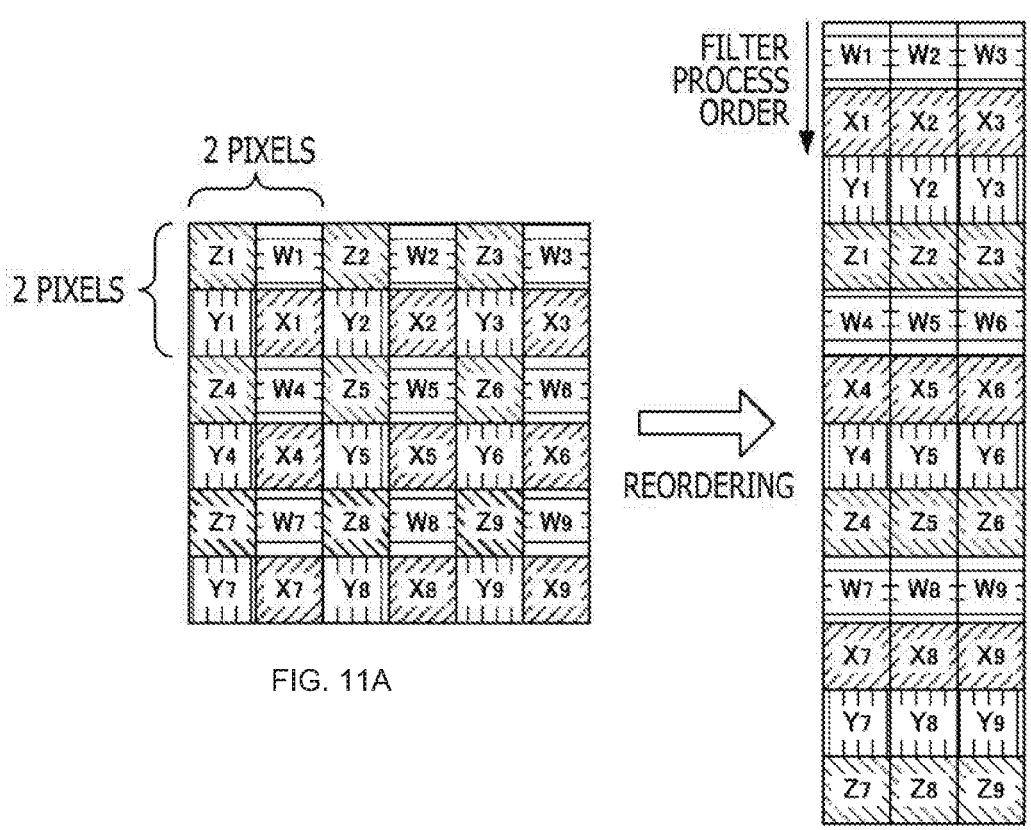
FIGS. 11A and 11B are views illustrating vertical reordering operation.

Then, the reordering section 321 reorders the pixel signals after the filter processing in the vertical direction. FIGS. 11A and 11B are views illustrating reordering operation in the vertical direction. The reordering section 321 reorders pixel signals of the pixel block of 2×2 pixels depicted in FIG. 11A, for which the filter process in the horizontal direction has been performed, in the vertical direction. In the reordering in the vertical direction, the reordering section 321 reorders the pixel signals of a pixel block of 2×2 pixels into pixel signals of a pixel block of 4×1 pixels arranged in a polarization order in a predetermined direction (for example, in a polarization order in a rotation direction in which the polarization angle increases) as depicted in FIG. 11B. In particular, pixel signals of a pixel block of 2×2 pixels configured from polarization pixels W1, X1, Y1 and Z1 are reordered into pixel signals of a pixel block of 4×1 pixels arranged in the order of the polarization pixels W1, X1, Y1 and Z1. Further, pixel signals of a pixel block of 2×2 pixels configured from polarization pixels W2, X2, Y2 and Z2 are reordered into pixel signals of a pixel block of 4×1 pixels in the order of the polarization pixels W2, X2, Y2 and Z2. Thereafter, pixel signals of each pixel block of 2×2 pixels are reordered into pixel signals of a pixel block of 4×1 pixels in the order in the predetermined rotation direction. It is to be noted that, although FIGS. 11A and 11B exemplifies a case in which pixel signals of a pixel block of 2×2 pixels obtained by performing an array restoration process for pixel signals after a filter process are reordered into pixel signals of a pixel block of 4×1 pixels, the filter section 32-1 may otherwise reorder the pixel signals depicted in FIG. 7B after the filter process into the pixel signals of FIG. 11B.

The filter processing section 322 performs the band pass filter process described above using the pixel signals after the filter process whose reordering in the vertical direction has been performed by the reordering section 321 and the filter coefficients stored in the filter coefficient storage section 34 to extract signal components that indicate a variation in cosine law.

The array restoration section 323 performs a restoration process of an array such that the pixel signals to be outputted from the filter processing section 322 have an array equal to that of the pixel signals generated by the imaging section 22-1.

The filter section 32-1 performs a band pass filter process for pixel signals reordered to such a polarization order in the horizontal direction and the vertical direction as described above from a captured image generated by the imaging section 22-1 to extract specular reflection components without being influenced by noise included in the captured image and so forth.

Figure 12:
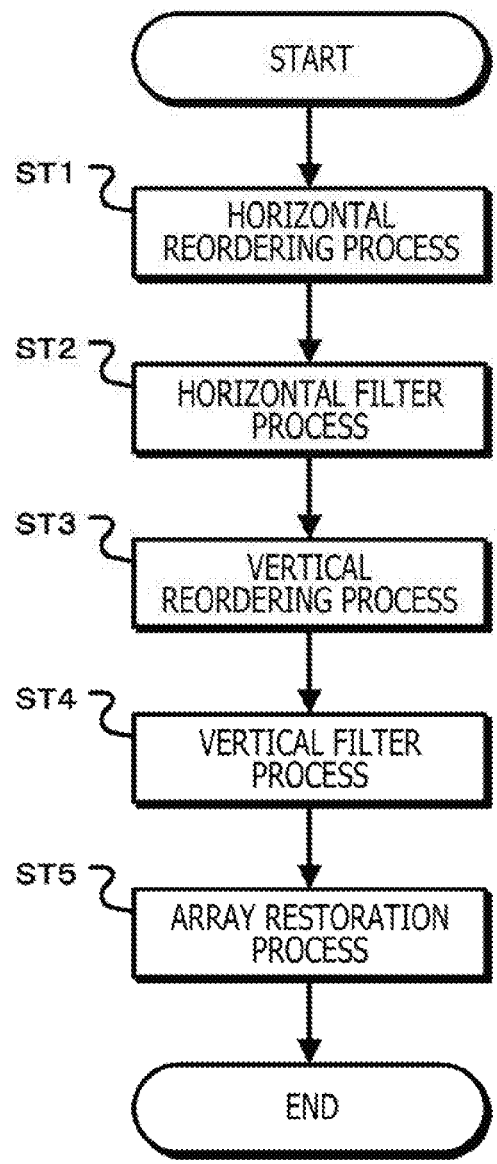
FIG. 12 is a flow chart exemplifying operation of the filter section in the first embodiment.

FIG. 12 is a flow chart exemplifying operation of the filter section in the first embodiment. In step ST1, the filter section performs a horizontal reordering process. The reordering section 321 of the filter section 32-1 rearranges pixel signals generated by the imaging section 22-1 to pixel signals in regard to which the horizontal direction is the polarization order in the predetermined rotation direction, and then the processing advances to step ST2.

In step ST2, the filter section performs a horizontal filter process. The filter processing section 322 of the filter section 32-1 performs a band pass filter process using the pixel signals rearranged in step ST1 in the order in the horizontal direction to extract polarization components, and then the processing advances to step ST3.

In step ST3, the filter section performs a vertical reordering process. The reordering section 321 of the filter section 32-1 rearranges the pixel signals, which have been filter processed in step ST2, to pixel signals in regard to which the vertical direction is the polarization order in the predetermined rotation direction, and then the processing advances to step ST4.

In step ST4, the filter section performs a vertical filter process. The filter processing section 322 of the filter section 32-1 performs a band pass filter process using the pixel signals, which have been rearranged in step ST3, in the order in the vertical direction to extract polarization components, and then the processing advances to step ST5.

In step ST5, the filter section performs an array restoration process. The array restoration section 323 of the filter section 32-1 performs restoration of an array such that the pixel signals filter processed in step ST4 have an array equal to that of the pixel signals generated by the imaging section 22-1.

With such a first embodiment as described above, a filter process for extracting signal components, which vary in response to a polarization cycle, from pixel signals arranged into a polarization order in a predetermined rotation direction using pixel signals of a polarization image generated by an imaging apparatus, in which polarization pixels with a plurality of polarization directions are provided repetitively in a predetermined array, is performed in regard to the horizontal direction and the vertical direction. Accordingly, polarization information indicative of specular reflection components can be acquired with high accuracy without being influenced by noise included in the polarization image and so forth.

4. Second Embodiment

Figures 13A, 13B, 13C:
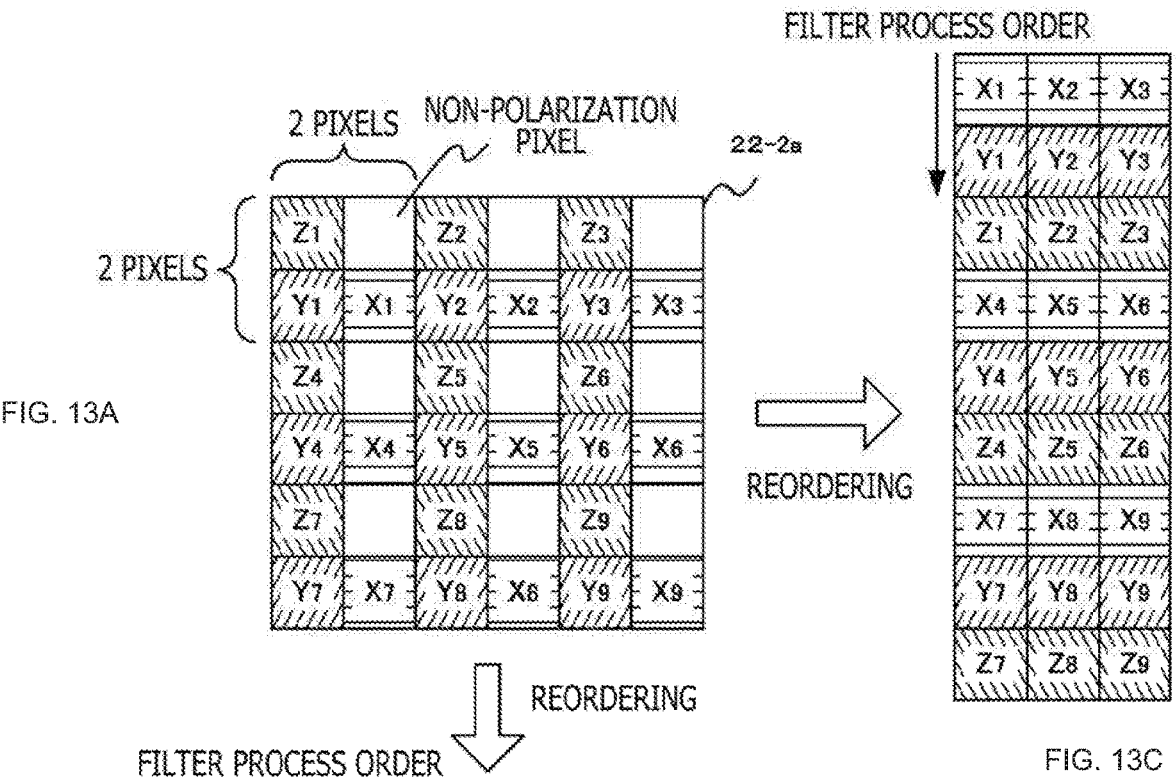
FIGS. 13A, 13B, and 13C are views exemplifying a pixel array (in the case of three polarization directions) of an imaging section in a second embodiment.

Now, a second embodiment is described. The second embodiment described below is directed to a case in which the polarization directions are smaller in number than four directions but are at least two or more directions. FIGS. 13A, 13B, and 13C exemplifies the pixel array of the imaging section in the second embodiment (in the case where the polarization directions are three directions). In the imaging section 22-2a, three pixels of a pixel block of 2×2 pixels are polarization pixels of different polarization directions, and the remaining one pixel is a non-polarization pixel (pixel for which no polarization filter is provided) as depicted in FIG. 13A, and such pixel blocks are provided repetitively. Further, for example, the three polarization directions have angles having equal angular differences from each other (60 degrees), and the polarization direction of the polarization pixel X is 0 degree; the polarization direction of the polarization pixel Y is 60 degrees; and the polarization direction of the polarization pixel Z is 120 degrees.

The filter section 32-2 of the information processing apparatus 30 in the second embodiment is configured similarly to the filter section 32-1 in the first embodiment. The filter section 32-2 performs a filter process for pixel signals of a polarization image generated by the imaging section 22-2*a* in the polarization order in the predetermined rotation direction of the pixel signals of the polarization pixels in a pixel block to generate polarization information indicative of specular reflection components.

The reordering section 321 of the filter section 32-2 reorders the pixel signals of the polarization pixels of a pixel block of 2×2 pixels depicted in FIG. 13A in the horizontal direction. In the reordering in the horizontal direction, as depicted in FIG. 13B, the pixel signals of the polarization pixels of a pixel block of 2×2 pixels are reordered into pixel signals of a pixel block of 1×3 pixels with the polarization order in a predetermined rotation direction (for example, with a polarization order in a rotation direction in which the polarization angle increases). In particular, pixel signals of polarization pixels X1, Y1 and Z1 in a pixel block of 2×2 pixels are reordered into pixel signals of a pixel block of 1×3 pixels arranged in the order of the polarization pixels X1, Y1 and Z1. Further, pixel signals of polarization pixels X2, Y2 and Z2 in a pixel block of 2×2 pixels, which are adjacent on the right side, are reordered into pixel signals of a pixel block of 1×3 pixels arranged in the order of the polarization pixels X2, Y2 and Z2. Thereafter, pixel signals of polarization pixels in each pixel block of 2×2 pixels are reordered into pixel signals of a pixel block of 1×3 pixels arranged in the polarization order in the predetermined rotation direction.

The filter processing section 322 performs a band pass filter process of the pixel signals for which reordering in the horizontal direction has been performed by the reordering section 321 to extract signal components that vary in response to a polarization cycle. In particular, the filter processing section 322 performs filter operation using the pixel signals for which the reordering in the horizontal direction has been performed by the reordering section 321 and filter coefficients stored in the filter coefficient storage section 34 to extract signal components that indicate a variation in cosine law.

Further, the reordering section 321 reorders the pixel signals after the filter process in the vertical direction. The reordering section 321 reorders the pixel signals for which the filter process in the horizontal direction has been performed in the vertical direction. In the reordering in the vertical direction, the pixel signals are reordered into pixel signals of a pixel block of 3×1 pixels in the polarization order in the predetermined rotation direction (for example, in the polarization order in a rotation direction in which the polarization angle increases). In particular, pixel signals of the polarization pixels X1, Y1 and Z1 in a pixel block of 2×2 pixels are reordered into pixel signals of a pixel block of 3×1 pixels in the order of the polarization pixels X1, Y1 and Z1. Further, pixel signals of the polarization pixels X2, Y2 and Z2 in a pixel block of 2×2 pixels are reordered into pixel signals of a pixel block of a 3×1 pixels in the order of the polarization pixels X2, Y2 and Z2. Thereafter, pixel signals of polarization pixels of each pixel block of 2×2 pixels are reordered into pixel signals of a pixel block of 3×1 pixels in the polarization order in the predetermined rotation direction. It is to be noted that, while FIGS. 13A, 13B, and 13C exemplifies a case in which pixel signals of a pixel block of 2×2 pixels obtained by an array restoration process performed for the pixel signals after the filter process are reordered into pixel signals of a pixel block of 3×1 pixels, the filter section 32-2 may reorder pixel signals depicted in FIG. 13B after the filter process into pixel signals of FIG. 13C.

The filter processing section 322 uses the pixel signals after the filter process for which the reordering in the vertical direction has been performed by the reordering section 321 and the filter coefficients stored in the filter coefficient storage section 34 to perform the band pass filter process described above to extract signal components that indicate a variation in cosine law.

The array restoration section 323 performs a restoration process of an array such that the pixel signals outputted from the filter processing section 322 indicate an array equal to that of the pixel signals generated by the imaging section 22-2*a*.

The filter section 32-2 performs a band pass filter process for the pixel signals arranged in the polarization order in the horizontal direction and the vertical direction as described above in regard to the captured image generated by the imaging section 22-2*a* to extract specular reflection components without being influenced by noise included in the captured image and so forth.

FIGS. 14A, 14B, and 14C exemplifies a different pixel array (in the case where two directions are applied as the polarization direction) of the imaging section in the second embodiment. In the imaging section 22-2*b*, two pixels in a pixel block of 2×2 pixels are polarization pixels with different polarization directions while the remaining two pixels are non-polarization pixels (pixels in which no polarization filter is provided), and such pixel blocks are provided repetitively. Further, for example, the two polarization directions have angles whose angular differences are equal (90 degrees), and the polarization direction of the polarization pixel X is 0 degree and the polarization direction of the polarization pixel Y is 90 degrees.

The filter section 32-2 of the information processing apparatus 30 performs, for pixel signals of a polarization image generated by the imaging section 22-2*b*, a filter process of pixel signals of polarization pixels in a pixel block in the polarization order in the predetermined rotation direction to generate polarization information indicative of specular reflection components.

The reordering section 321 of the filter section 32-2 reorders pixel signals of polarization pixels of a pixel block of 2×2 pixels depicted in FIG. 14A in the horizontal direction. In the reordering in the horizontal direction, the pixel signals are reordered into pixel signals of a pixel block of 1×2 pixels in the polarization order in the predetermined rotation direction (for example, in the polarization order in a rotation direction in which the polarization angle increases) as depicted in FIG. 14B. In particular, pixel signals of the polarization pixels X1 and Y1 in a pixel block of 2×2 pixels are reordered into pixel signals of a pixel block of 1×2 pixels in the order of the polarization pixels X1 and Y1. Further, pixel signals of polarization pixels X2 and Y2 in a pixel block of 2×2 pixels adjacent on the right side are reordered into pixel signals of a pixel block of 1×2 pixels in the order of the polarization pixels X2 and Y2. Thereafter, pixel signals of polarization pixels in each pixel block of 2×2 pixels are reordered into pixel signals of a pixel block of 1×2 pixels in the polarization order in the predetermined rotation direction.

The filter processing section 322 performs a band pass filter process of the pixel signals for which reordering in the horizontal direction has been performed by the reordering section 321 to extract signal components that change in response to a polarization cycle. In particular, the filter processing section 322 performs filter operation using the pixel signals for which the reordering in the horizontal direction has been performed by the reordering section 321 and the filter coefficients stored in the filter coefficient storage section 34 to extract signal components that indicate a a variation in cosine law.

Further, the reordering section 321 reorders image signals after the filter process in the vertical direction. The reordering section 321 reorders the pixel signals, for which the filter process in the horizontal direction has been performed, in the vertical direction. In the reordering in the vertical direction, the pixel signals are reordered into pixel signals of a pixel block of 2×1 pixels in the polarization order in the predetermined rotation direction (for example, in the polarization order in a rotation direction in which the polarization angle increases) as depicted in FIG. 14C. In particular, pixel signals of the polarization pixels X1 and Y1 in a pixel block of 2×2 pixels are reordered into pixel signals of a pixel block of 2×1 pixels in the order of the polarization pixels X1 and Y1. Further, pixel signals of polarization pixels X2 and Y2 in a pixel block of 2×2 pixels are reordered into pixel signals of a pixel block of 2×1 pixels in the order of the polarization pixels X2 and Y2. Thereafter, pixel signals of polarization pixels of each pixel block of 2×2 pixels are similarly reordered into pixel signals of a pixel block of 2×1 pixels in the polarization order in the predetermined rotation direction. It is to be noted that, while FIGS. 14A, 14B, and 14C exemplifies a case in which pixel signals of a pixel block of 2×2 pixels obtained by performing an array restoration process for pixel signals after a filter process are reordered into pixel signals of a pixel block of 2×1 pixels, the filter section 32-2 may otherwise reorder the pixel signals depicted in FIG. 14B after the filter process into pixel signals of FIG. 14C.

The filter processing section 322 performs the band pass filter process described above using the pixel signals after the filter process for which the reordering in the vertical direction has been performed by the reordering section 321 and the filter coefficients stored in the filter coefficient storage section 34 to extract signal components that indicate a variation in cosine law.

The array restoration section 323 performs a restoration process of an array such that pixel signals outputted from the filter processing section 322 are arranged into an array equal to that of pixel signals generated by the imaging section 22-2a.

The filter section 32-2 performs a band pass filter process for the pixel signals with the polarization order in the horizontal direction and the vertical direction as described above for the captured image generated by the imaging section 22-2b to extract specular reflection components without being influenced by noise included in the captured image and so forth.

With such a second embodiment as described above, a filter process for extracting signal components, which vary in response to a polarization cycle, from pixel signals arranged into a polarization order in a predetermined rotation direction using pixel signals of a polarization image generated by an imaging apparatus, in which polarization pixels with a plurality of polarization directions are provided repetitively in a predetermined array, is performed in regard to the horizontal direction and the vertical direction similarly as in the first embodiment. Accordingly, polarization information indicative of specular reflection components can be acquired with high accuracy without being influenced by noise included in the polarization image and so forth. Further, not only in the case where polarization pixels in a pixel block of 2×2 pixels in the imaging section include those with four directions, but also in the case where such polarization pixels include those with three or two directions, polarization information indicative of specular reflection components can be acquired without being influenced by noise included in the polarization images and so forth. Furthermore, since a non-polarization pixel is provided in the pixel block of 2×2 pixels, even in the case where a polarization image and a non-polarization image are generated simultaneously, polarization information indicative of specular reflection components can be generated with high accuracy.

5. Third Embodiment

Now, a third embodiment is described. Although the first and second embodiments described above are directed to a case in which reordering in the horizontal direction and the vertical direction is performed, the third embodiment described below is directed to a configuration that does not require reordering.

Figure 15:
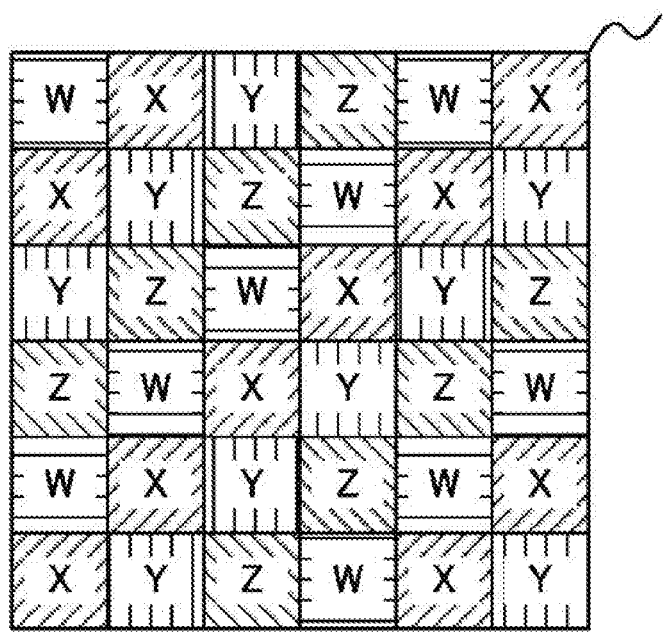
FIG. 15 is a view exemplifying a pixel array of an imaging section in a third embodiment.

FIG. 15 exemplifies a pixel array of the imaging section in the third embodiment. In the imaging section 22-3a, each pixel is a polarization pixel of one of four different polarization directions, and the polarization pixels are arrayed such that they are disposed in the polarization order in a predetermined rotation direction in the horizontal direction and the vertical direction. For example, the angular differences between the four polarization directions are equal to each other (45 degrees), and the polarization direction of the polarization pixel W is 0 degree; the polarization direction of the polarization pixel X is 45 degrees; the polarization direction of the polarization pixel Y is 90 degrees; and the polarization direction of the polarization pixel Z is 135 degrees. Further, the polarization pixels are arranged in the order of the polarization pixels W, X, Y and Z, for example, in the horizontal direction and the vertical direction.

Since the filter section 32-3 of the information processing apparatus 30 in the third embodiment performs a filter process without performing reordering of pixel signals because polarization pixels of the imaging section 22-3a are arranged in the order of a predetermined polarization rotation direction. Therefore, in the filter section 32-3, there is no necessity to provide the reordering section 321 and the array restoration section 323 of the filter section 32-1 of the first embodiment.

The filter processing section 322 of the filter section 32-3 performs a band pass filter process using pixel signals with the order of the horizontal direction of a polarization image generated by the imaging section 22-3a and filter coefficients stored in the filter coefficient storage section 34 to extract signal components that vary in response to a polarization cycle. In particular, the filter processing section 322 performs filter operation using the pixel signals with the order in the horizontal direction of the polarization image and the filter coefficients stored in the filter coefficient storage section 34 to extract signal components that indicate a variation in cosine law. Furthermore, the filter processing section 322 uses the pixel signals after the filter process in the horizontal direction in the order in the vertical direction to perform a band pass filter process using the pixel signals and the filter coefficients stored in the filter coefficient storage section 34 to extract signal components that vary in response to a polarization cycle.

The filter section 32-3 performs a band pass filter process using pixel signals of a captured image generated by the imaging section 22-3a in the order in the horizontal direction and the vertical direction to extract specular reflection components without being influenced by noise included in the captured image and so forth.

Figure 16:
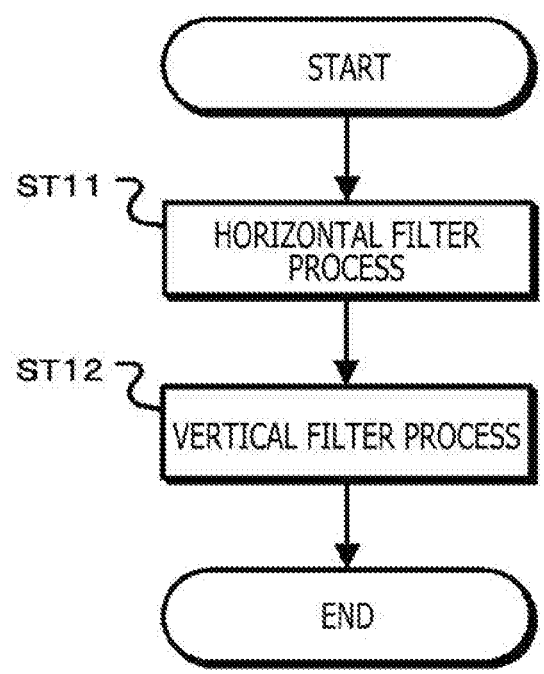
FIG. 16 is a flow chart exemplifying operation of a filter section in the third embodiment.

FIG. 16 is a flow chart exemplifying operation of the filter section in the third embodiment. In step ST11, the filter section performs a horizontal filter process. The filter section 32-3 performs a band pass filter process using pixel signals generated by the imaging section 22-3a in the order in the horizontal direction to extract pixel signals of polarization components, and the processing advances to step ST12.

In step ST12, the filter section performs a vertical filter process. The filter section 32-3 performs a band pass filter process using the pixel signals filter processed in step ST2 in the vertical order to generate polarization component pixel signals from which noise is removed.

Figure 17A:
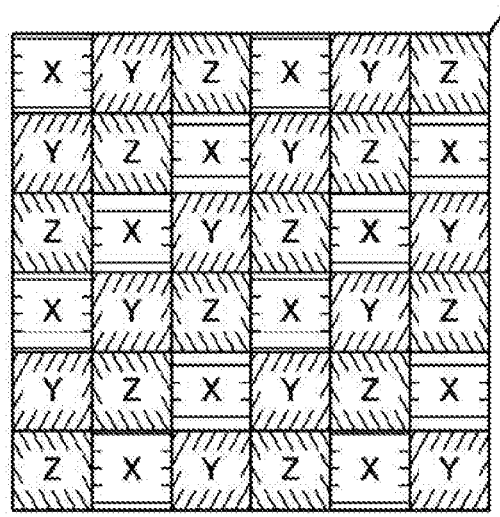
FIGS. 17A and 17B are views exemplifying a different pixel array of the imaging section in the third embodiment.
Figure 17B:
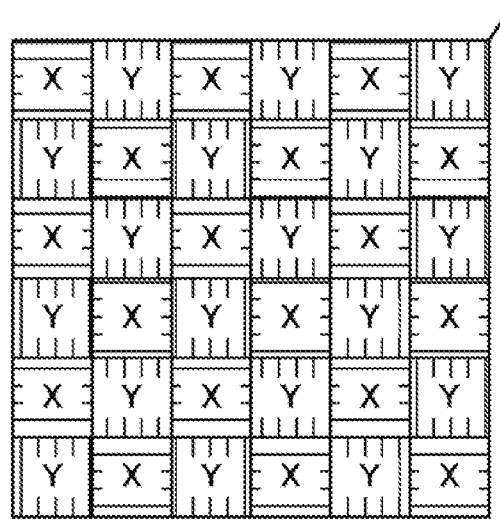

Further, the polarization directions in the imaging section are not limited to four directions but may be three directions or two directions. FIGS. 17A and 17B exemplifies another pixel array of the imaging section in the third embodiment. In the imaging section 22-3b in the third embodiment depicted in FIG. 17A, each pixel is a polarization pixel of one of three polarization directions different from one another, and such arrays of the polarization pixels are arranged in the polarization order in a predetermined rotation direction in the horizontal direction and the vertical direction. For example, the three polarization directions have angles having angular differences equal to each other (60 degrees), and the polarization direction of the polarization pixel X is 0 degree; the polarization direction of the polarization pixel Y is 60 degrees; and the polarization direction of the polarization pixel Z is 120 degrees. Further, the polarization pixels are arranged, for example, in the order of the polarization pixels X, Y and Z in the horizontal direction and the vertical direction. Meanwhile, in the imaging section 22-3c depicted in FIG. 17B, each pixel is a polarization pixel with one of two polarization directions different from each other, and the array of polarization pixels is arranged in the polarization order in a predetermined rotation direction in the horizontal direction and the vertical direction. For example, the two polarization directions have angles the angular differences between which are equal to each other (90 degrees), and the polarization direction of the polarization pixel X is 0 degree and the polarization direction of the polarization pixel Y is 90 degrees. Further, the polarization pixels are arranged, for example, in the order of the polarization pixels X and Y in the horizontal direction and the vertical direction.

The filter processing section 322 of the filter section 32-3 performs a band pass filter process using pixel signals in the horizontal order of a polarization image generated by the imaging section 22-3b (22-3c) and filter coefficients stored in the filter coefficient storage section 34 to extract signal components that vary in response to a polarization cycle. In particular, the filter processing section 322 performs filter operation using the pixel signals with the horizontal order of the polarization image and the filter coefficients stored in the filter coefficient storage section 34 to extract signal components that indicate a variation in cosine law. Furthermore, the filter processing section 322 uses the pixel signals after the filter process in the horizontal direction in the order of the vertical direction to perform a band pass filter process using the pixel signals and the filter coefficients stored in the filter coefficient storage section 34 to extract signal components that vary in response to a polarization cycle.

The filter section 32-3 uses the pixel signals of a captured image generated by the imaging section 22-3b (22-3c) in the order in the horizontal direction and the vertical direction as described above to extract specular reflection components without being executed by noise included in the captured image or the like.

With such a third embodiment as described above, a filter process for extracting signal components, which vary in response to a polarization cycle, from pixel signals arranged into a polarization order in a predetermined rotation direction using pixel signals of a polarization image generated by an imaging apparatus, in which polarization pixels with a plurality of polarization directions are provided repetitively in a predetermined array, is performed in regard to the horizontal direction and the vertical direction, similarly as in the first embodiment. Accordingly, polarization information indicative of specular reflection components can be acquired with high accuracy without being influenced by noise included in the polarization image and so forth. Further, since the array of polarization pixels in the imaging section has a polarization order in a predetermined rotation direction in the horizontal direction and the vertical direction, there is no necessity for the filter section to perform reordering of pixel signals, and therefore, the configuration of the information processing apparatus can be simplified in comparison with that in the first embodiment and the second embodiment.

6. Fourth Embodiment

Incidentally, since specular reflection components indicate a variation in cosine law, pixel signals are not limited to those with a polarization order in a predetermined rotation direction, and even if pixel signals have a polarization order in an opposite rotation direction to the predetermined rotation direction, by performing a similar filter process, signal components that vary in response to a polarization cycle can be extracted. Accordingly, the array of polarization pixels may be configured such that it includes a pixel group with a polarization order in which the horizontal direction and the vertical direction are a predetermined rotation direction and another pixel group with a polarization order in which the horizontal direction and the vertical direction are an opposite rotation direction to the predetermined rotation direction.

Figure 18:
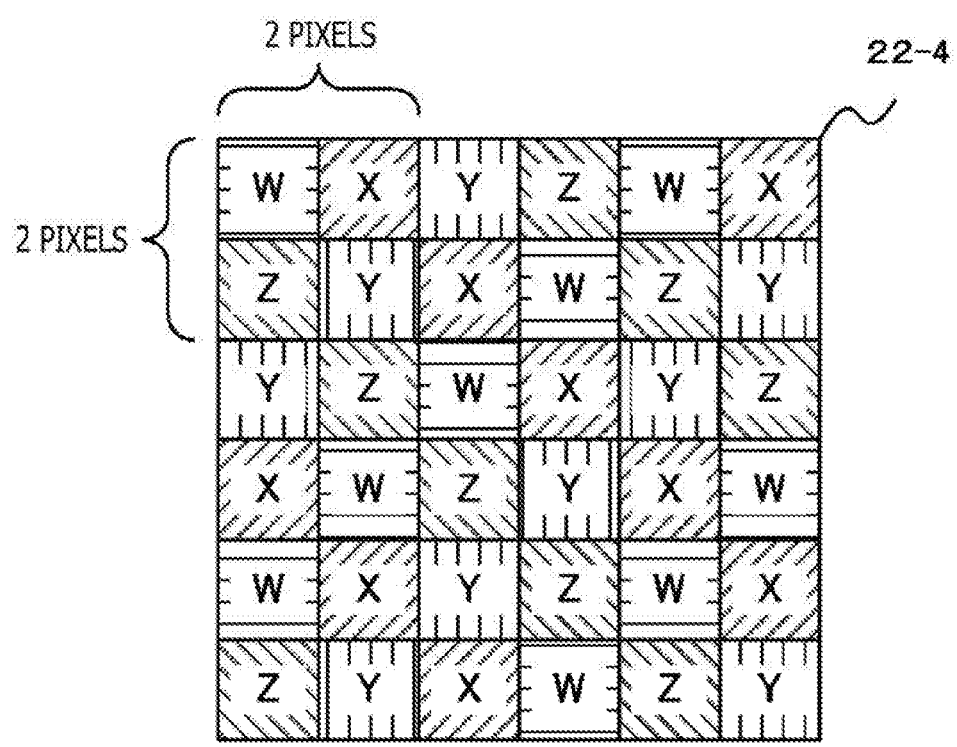
FIG. 18 is a view exemplifying a pixel array of an imaging section in a fourth embodiment.

FIG. 18 exemplifies a pixel array of an imaging section in a fourth embodiment. The imaging section 22-4 includes pixels each of which is a polarization pixel in one of four different polarization directions, and, for example, the four polarization directions have angles (45 degrees) between which angular differences are equal to each other such that the polarization direction of a polarization pixel W is 0 degree; the polarization direction of a polarization pixel X is 45 degrees; the polarization direction of a polarization pixel Y is 90 degrees; and the polarization direction of a polarization pixel Z is 135 degrees. Further, the array of the polarization pixels is an array in which pixel groups having a polarization order in a predetermined rotation direction in a horizontal direction and a vertical direction and pixel groups having a polarization order in the opposite direction are provided alternately. For example, in a pixel group adjacent in the vertical direction to a pixel group in which polarization pixels are disposed in the order of polarization pixels W, X, Y and Z in the horizontal direction, the polarization pixels are disposed in the order of the polarization pixels of Z, Y, X and W. Further, in a pixel group adjacent in the vertical direction to a pixel group in which the polarization pixels are disposed in the order of the polarization pixels Z, Y, X and W in the horizontal direction, the polarization pixels are disposed in the order of the polarization pixels W, X, Y and Z. Also in regard to the vertical direction, a similar configuration is applied. Furthermore, an image block of 2×2 pixels is configured such that it includes polarization pixels W, X, Y and Z with the four polarization directions.

Since, in the filter section 32-4 of the information processing apparatus 30 in the fourth embodiment, polarization pixels are disposed in the order in the predetermined rotation direction or in the opposite direction and an image block of 2×2 pixels includes polarization pixels of the four polarization directions, the filter section 32-4 has a configuration equal to that of the filter section 32-1 of the first embodiment or of the filter section 32-3 of the third embodiment.

In the case where the filter section 32-4 is configured equivalently to the filter section 32-1, the reordering section 321 reorders the pixel signals of a pixel block of 2×2 pixels in the horizontal direction, for example, reorders the pixel signals into pixel signals of a pixel block of 1×4 pixels with a polarization order in a predetermined rotation direction. The filter processing section 322 performs a band pass filter process of the pixel signals for which reordering in the horizontal direction has been performed by the reordering section 321 to extract signal components that vary in response to a polarization cycle. In particular, the filter processing section 322 performs filter operation using the pixel signals for which the reordering in the horizontal direction has been performed by the reordering section 321 and filter coefficients stored in the filter coefficient storage section 34 to extract signal components that indicate a variation in cosine law.

Then, the reordering section 321 reorders the pixel signals after the filter process in the vertical direction. The reordering section 321 reorders the pixel signals of a pixel block of 2×2 pixels, for which the filter process in the horizontal direction has been performed, in the vertical direction, for example, re-arranges the pixel signals into pixel signals of a pixel block of 4×1 pixels with the polarization order in a predetermined rotation direction. The filter processing section 322 performs the band pass filter process described above using the pixel signals after the filter process for which the reordering in the vertical direction has been performed by the reordering section 321 and the filter coefficients stored in the filter coefficient storage section 34 to extract signal components that indicate a variation in cosine law.

The array restoration section 323 performs a restoration process of an array such that pixel signals to be outputted from the filter processing section 322 have an array equivalent to that of the pixel signals generated by the imaging section 22-4.

The filter section 32-4 performs a band pass filter process for a captured image generated by the imaging section 22-4 in the polarization order in the horizontal direction and the vertical direction of pixel signals of a pixel block of 2×2 pixels as described above to extract specular reflection components without being influenced by noise or the like included in the captured image.

In the case where the filter section 32-4 is configured equivalently to the filter section 32-3, the filter processing section 322 of the filter section 32-4 performs a band pass filter process using the pixel signals in the horizontal order of the polarization image generated by the imaging section 22-4 and the filter coefficients stored in the filter coefficient storage section 34 to extract signal components that vary in response to a polarization cycle. In particular, the filter processing section 322 performs filter operation using the pixel signals in the horizontal order of the polarization image and the filter coefficients stored in the filter coefficient storage section 34 to extract signal components that indicate a variation in cosine law. Furthermore, the filter processing section 322 performs, using the pixel signals after the filter process in the horizontal direction in the order in the vertical direction, a band pass filter process using the pixel signals and the filter coefficients stored in the filter coefficient storage section 34 to extract signal components that vary in response to a polarization cycle.

The filter section 32-4 performs a band pass filter process using the pixel signals of the captured image generated by the imaging section 22-4 in the order in the horizontal direction and the vertical direction as described hereinabove to extract specular reflection components without being influenced by noise included in the captured image and so forth.

Furthermore, the filter section 32-4 of the information processing apparatus 30 in the fourth embodiment may be configured such that operation of the filter section 32-1 and operation of the filter section 32-3 are performed selectively. For example, since, in the operation of the filter section 32-1, reordering of pixels is performed for each block of 2×2 pixels, the length of the pixel range to be used for a tap can be reduced from that by operation of the filter section 32-3, which performs a filter process using the pixel signals generated by the imaging section 22-4 in the order in the horizontal direction or the vertical direction. Accordingly, if the information processing apparatus 30 performs operation of the filter section 32-3, for example, for an imaging object or the like that is long in the horizontal direction or the vertical direction, but performs operation of the filter section 32-1 in the case where the size of an imaging object in the captured screen image is small, then a filter process suitable for an imaging object that is imaged by the imaging section 22-4 can be performed.

With such a fourth embodiment as described above, a filter process for extracting signal components, which vary in response to a polarization cycle, from pixel signals arranged into a polarization order in a predetermined rotation direction using pixel signals of a polarization image generated by an imaging apparatus, in which polarization pixels with a plurality of polarization directions are provided repetitively in a predetermined array, is performed in regard to the horizontal direction and the vertical direction similarly as in the first embodiment. Accordingly, polarization information indicative of specular reflection components can be acquired with high accuracy without being influenced by noise included in the polarization image and so forth. Further, since it is possible to perform the filter operation of the first embodiment or the third embodiment, a filter process according to an imaging object can be performed.

7. Fifth Embodiment

Figure 19:
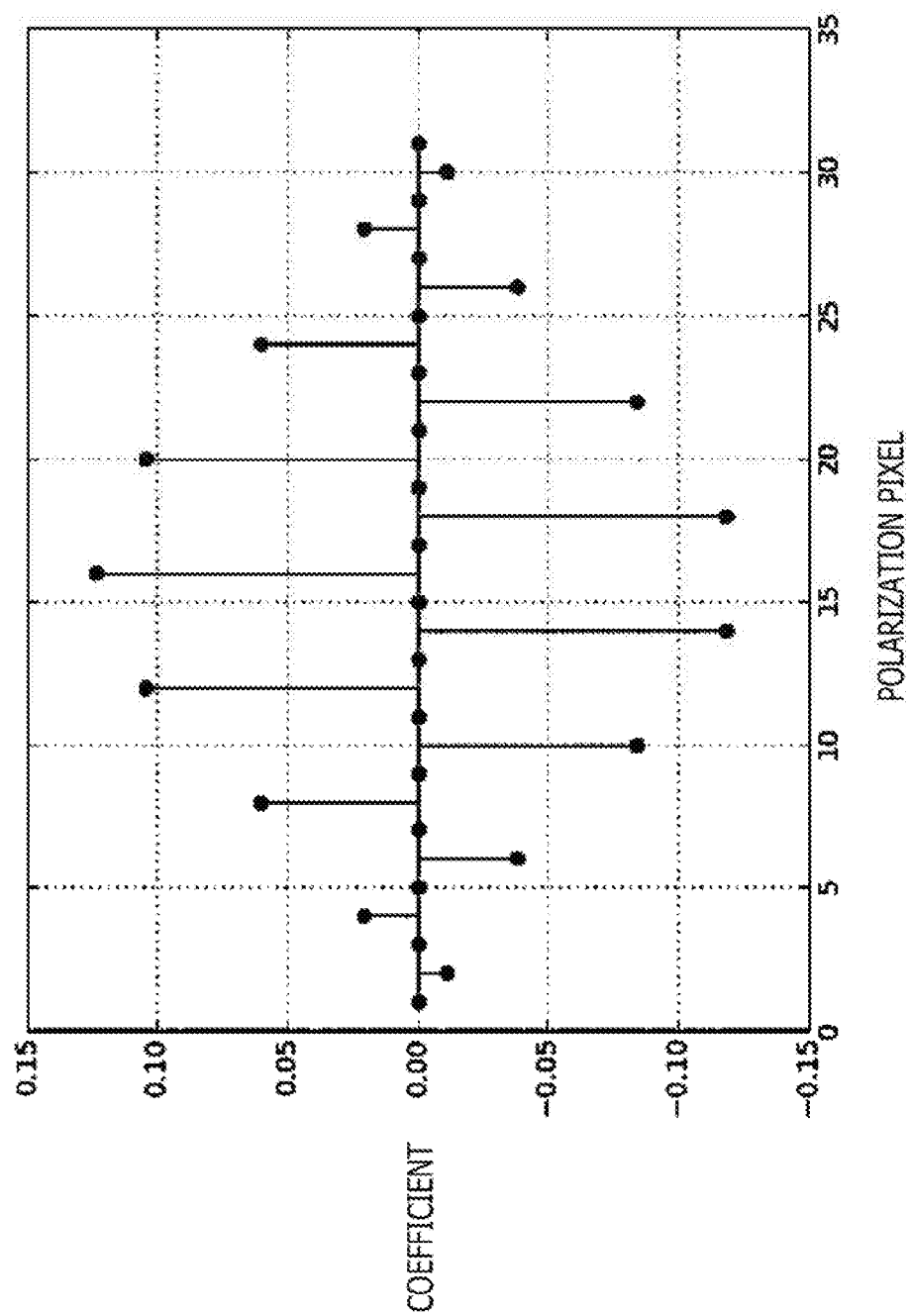
FIG. 19 is a view exemplifying filter coefficients.
Figures 20A, 20B, 20C:
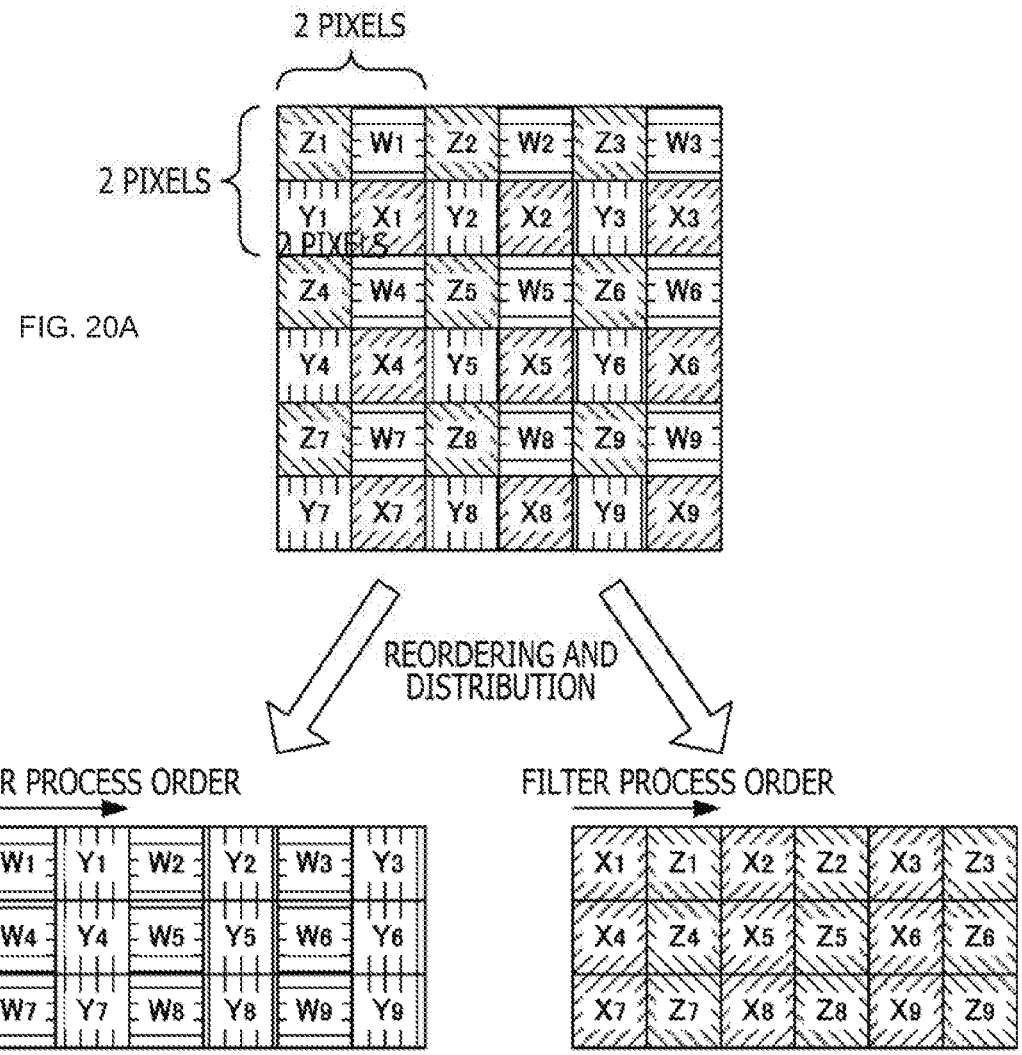
FIGS. 20A, 20B, and 20C are views illustrating operation (part 1) of a reordering section in a fifth embodiment.
Figures 21A, 21B, 21C:
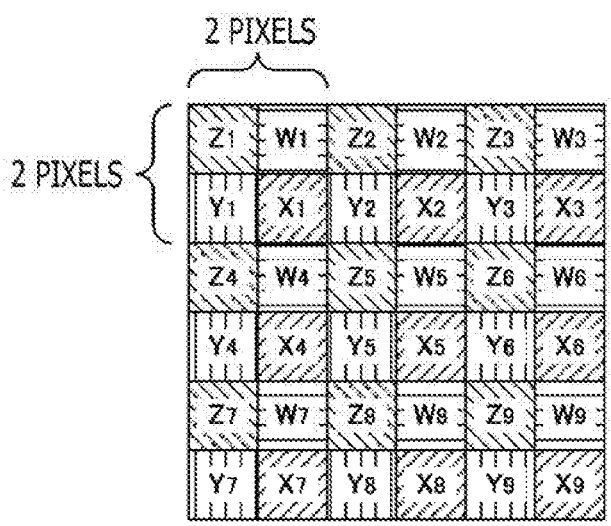
FIGS. 21A, 21B, and 21C are views illustrating the operation (part 2) of the reordering section in the fifth embodiment.

Now, a fifth embodiment is described. The filter section 32 of the information processing apparatus 30 performs a band pass filter process using filter coefficients stored in the filter coefficient storage section 34. FIG. 19 exemplifies filter coefficients. The imaging section has an array in which, for example, pixel blocks each including polarization pixels of four polarization directions are provided repetitively as depicted in FIG. 5 and the polarization directions have angular differences of an equal angle (45 degrees) therebetween such that the polarization direction of the polarization pixel W is 0 degree; the polarization direction of the polarization pixel X is 45 degrees; the polarization direction of the polarization pixel Y is 90 degrees; and the polarization direction of the polarization pixel Z is 135 degrees. For example, in the case where a polarization image generated by the imaging section is subjected to an FIR (Finite Impulse Response) filter process by the filter section, the filter coefficients when the filter section has 35 taps become "0" at every other tap as depicted in FIG. 19. In the case where the coefficient is "0", it does not contribute to a filter operation result. Accordingly, when polarization pixels are to be filter processed, pixels of a polarization direction with regard to which the filter coefficient is 0 are distributed to a pixel signal group different from that to which polarization pixels of a filter process target are distributed, and a filter process is performed for each of the pixel signal groups to reduce the scale of the filter processing section 322.

The filter section 32-5 in the fifth embodiment includes a reordering section 321, a filter processing section 322 and an array restoration section 323 similarly to the filter section 32-1 in the first embodiment.

The reordering section 321 rearranges pixel signals in a pixel block into an array in which the horizontal direction or the vertical direction is a polarization order in the predetermined rotation direction. Further, the reordering section 321 distributes the pixel signals after the reordering for each pixel to generate two pixel signal groups.

FIGS. 20A, 20B, 20C, 21A, 21B, and 21C are views illustrating operation of the reordering section in the fifth embodiment. The reordering section 321 reorders the pixel signals of a pixel block of 2×2 pixels depicted in FIG. 20A in the horizontal direction. In the reordering in the horizontal direction, the pixel signals are reordered into a polarization order in the predetermined rotation direction (for example, in the polarization order in a rotation direction in which the polarization angle increases). Further, the reordering section 321 distributes the pixel signals after the reordering to generate a WY pixel signal group depicting in FIG. 20B configured from pixel signals of polarization pixels W and polarization pixels Y and an XZ pixel signal group depicted in FIG. 20C configured from pixel signals of polarization pixels X and polarization pixels Z.

Figure 22:
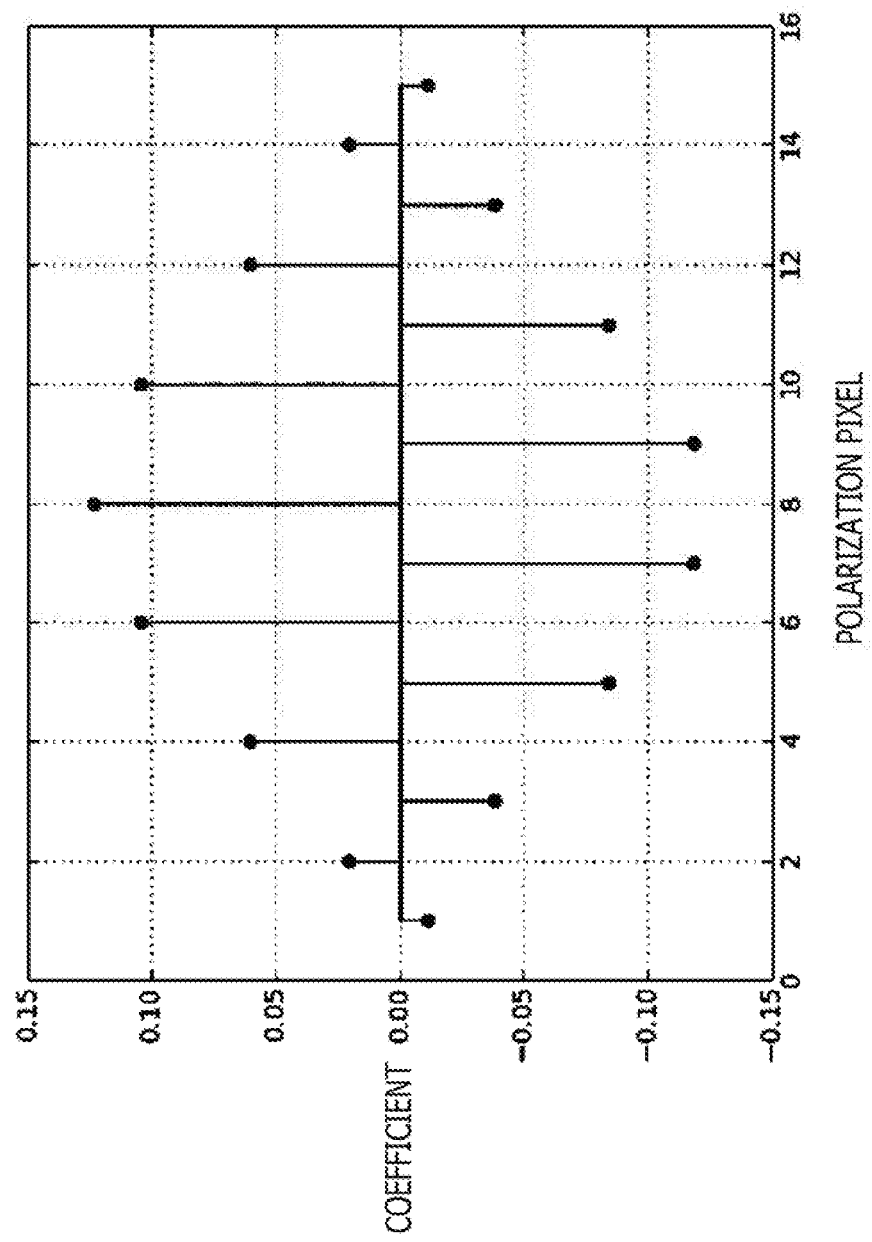
FIG. 22 is a view exemplifying filter coefficients used in band pass filter processing for a WY pixel signal group and an XZ pixel signal group.

The filter processing section 322 performs a band pass filter process using the pixel signals of the WY pixel signal group obtained by the distribution and the filter coefficients stored in the filter coefficient storage section 34. Further, the filter processing section 322 performs a band pass filter process using the pixel signals of the XZ pixel signal group obtained by the distribution and the filter coefficients stored in the filter coefficient storage section 34. It is to be noted that FIG. 22 exemplifies filter coefficients to be used for a band pass filter process of the WY pixel signal group and the XZ pixel signal group. If the band pass filter process is performed separately for the WY pixel signal group and the XZ pixel signal group in this manner, then the FIR (Finite Impulse Response) filter process can be performed with 16 taps and the scale of the filter processing section 322 can be reduced.

Then, the reordering section 321 reorders the pixel signals after the filter process in the vertical direction and distributes the reordered pixel signals for each pixel to generate two pixel signal groups. The reordering section 321 reorders the pixel signals of a pixel block of 2×2 pixels depicted in FIG. 21A in the vertical direction. In the reordering in the vertical direction, the pixel signals are reordered in the polarization order in a predetermined rotation direction (for example, in a polarization order in the rotation direction in which the polarization angle increases). Furthermore, the reordering section 321 distributes the pixel signals after the reordering for each pixel to generate the WY pixel signal group depicted in FIG. 21B configured from pixel signals of polarization pixels W and polarization pixels Y and the XZ pixel signal group depicted in FIG. 21C configured from polarization pixels X and polarization pixels Z.

The filter processing section 322 performs a band pass filter process using the pixel signals of the WY pixel signal group obtained by the distribution and the filter coefficients stored in the filter coefficient storage section 34 and a band pass filter using the pixel signals of the XZ pixel signal group obtained by the distribution and the filter coefficients stored in the filter coefficient storage section 34.

The array restoration section 323 performs a restoration process of an array such that pixel signals outputted from the filter processing section 322 have an array equivalent to that of the pixel signals generated by the imaging section 22.

The filter section 32-5 performs a band pass filter process for a captured image generated by the imaging section 22 for each of a plurality of pixel signal groups in which the pixel signals are arranged in a polarization order in the horizontal direction and the vertical direction as described above to extract specular reflection components without being influenced by noise included in the captured image and so forth.

Figure 23:
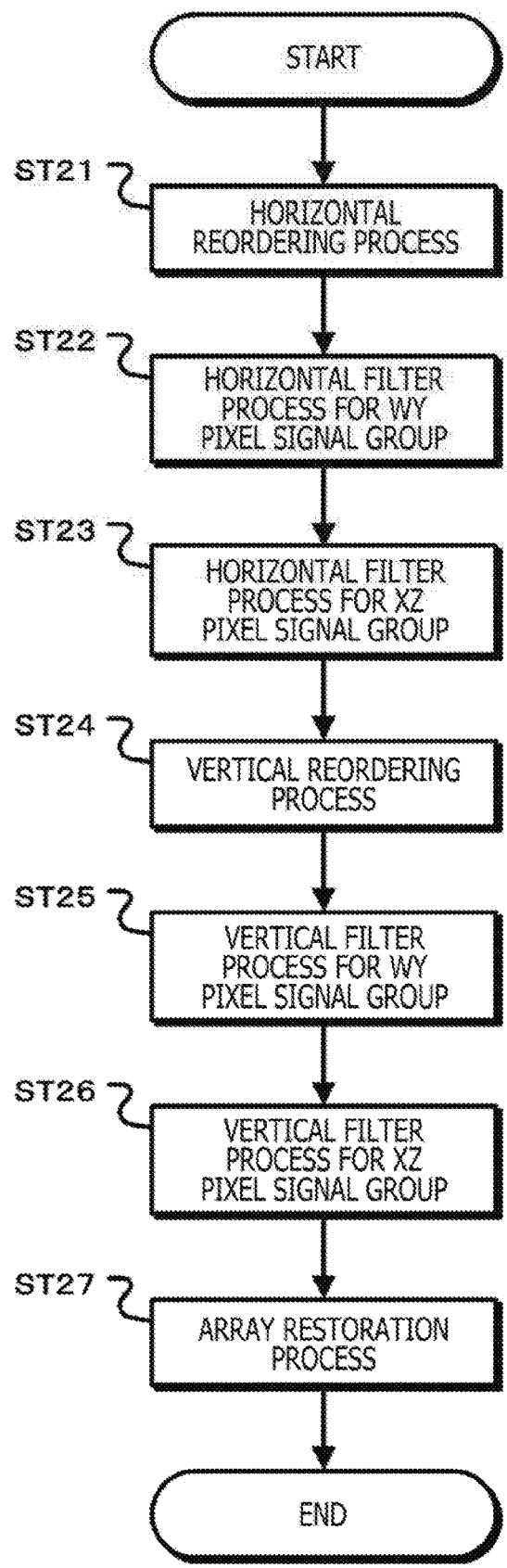
FIG. 23 is a flow chart exemplifying operation of a filter section in the fifth embodiment.

FIG. 23 is a flow chart exemplifying operation of the filter section in the fifth embodiment. In step ST21, the filter section performs a horizontal reordering process. The reordering section 321 of the filter section 32-5 rearranges pixel signals generated by the imaging section 22-1 into pixel signals in a polarization order in a predetermined rotation direction in the horizontal direction. Further, the reordering section 321 distributes the pixel signals with the polarization order in the predetermined rotation direction for each pixel into pixel signals of a WY pixel signal group and a WY pixel signal group, and then the processing advances to step ST22.

In step ST22, the filter section performs a horizontal filter process of the WY pixel signal group. The filter processing section 322 of the filter section 32-5 performs a band pass filter process using the pixel signals of the WY pixel signal group generated in step ST21 in the order in the horizontal direction, and the processing advances to step ST23.

In step ST23, the filter section performs a horizontal filter process of the XZ pixel signal group. The filter processing section 322 of the filter section 32-5 performs a band pass filter process using the pixel signals of the XZ pixel signal group generated in step ST21 in the horizontal order, and the processing advances to step ST24.

In step ST24, the filter section performs a vertical reordering process. The reordering section 321 of the filter section 32-5 rearranges the pixel signals filter processed in steps ST22 and ST23 into pixel signals in a polarization order in a predetermined rotation direction in the vertical direction. Further, the reordering section 321 distributes the pixel signals in the polarization order in the predetermined rotation direction for each pixel into pixel signals of a WY pixel signal group and an XZ pixel signal group, and the processing advances to step ST25.

In step ST25, the filter section performs a vertical filter process of the WY pixel signal group. The filter processing section 322 of the filter section 32-5 uses the pixel signals of the WY pixel signal group generated in step ST24 in the order in the vertical direction to perform a band path filter process, and then the processing advances to step ST26.

In step ST26, the filter section performs a vertical filter process of the XZ pixel signal group. The filter processing section 322 of the filter section 32-5 performs a band pass filter process using the pixel signals of the XZ pixel signal group generated in step ST24 in the order in the vertical direction, and the processing advances to step ST27.

In step ST27, the filter section performs an array restoration process. The array restoration section 323 of the filter section 32-5 returns the array of pixel signals filter processed in steps ST25 and ST26 into an array equivalent to that of the pixel signals generated by the imaging section 22.

It is to be noted that, although the fifth embodiment exemplifies a case in which the imaging section 22 generates polarization pixels having four different polarization directions (W=0 degree, X=45 degrees, Y=90 degrees, and Z=135 degrees), it is sufficient if the imaging section has a polarization pixel configuration by which, when the polarization pixels are to be filter processed, pixels in a polarization direction whose filter coefficient is "0" can be distributed to a different pixel signal group to perform a filter process for each pixel signal group, and the number of polarization directions or the polarization angles may be different from those of the exemplified imaging section.

In this manner, with the fifth embodiment, a filter process for extracting signal components, which vary in response to a polarization cycle, from pixel signals arranged into a polarization order in a predetermined rotation direction using pixel signals of a polarization image generated by an imaging apparatus, in which polarization pixels with a plurality of polarization directions are provided repetitively in a predetermined array, is performed in regard to the horizontal direction and the vertical direction similarly as in the first embodiment. Accordingly, polarization information indicative of specular reflection components can be acquired with high accuracy without being influenced by noise included in the polarization image and so forth. Further, since distribution of pixel signals is performed and a filter process is performed for each pixel signal group, it is possible to reduce the tap number of the filter processing section 322, and the filter processing section can be simplified in configuration in comparison with the first embodiment and so forth.

8. Other Embodiments

While the embodiments described hereinabove exemplify a case in which a filter process is performed in regard to each of the horizontal direction and the vertical direction, the filter section may otherwise perform a filter process only in regard to the horizontal direction to acquire polarization information indicative of specular reflection components. For example, if the imaging section has the configuration presented by the third embodiment, then since pixel signals generated by the imaging section can be filter processed in order such that polarization information is acquired, this is suitable for a case in which the information processing apparatus is used in fields in which polarization information is required on the real time basis.

Figure 24A:
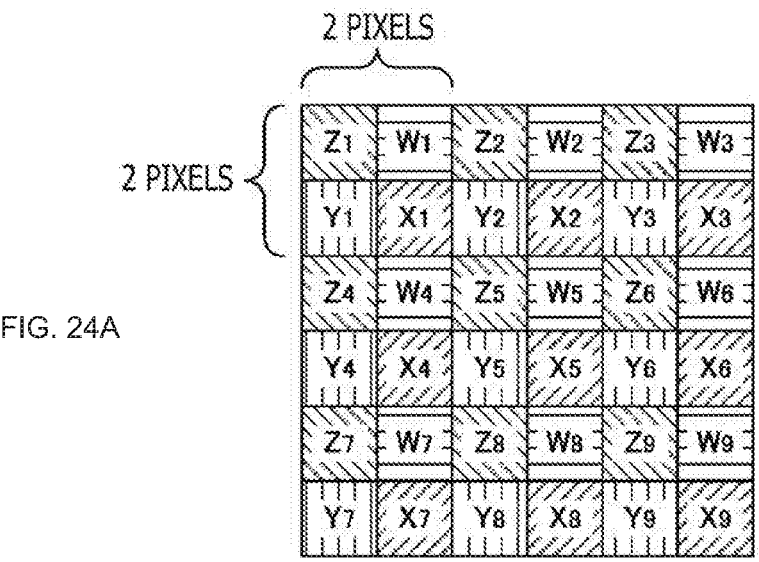
FIGS. 24A and 24B are views illustrating a different example of horizontal reordering operation.
Figure 24B:
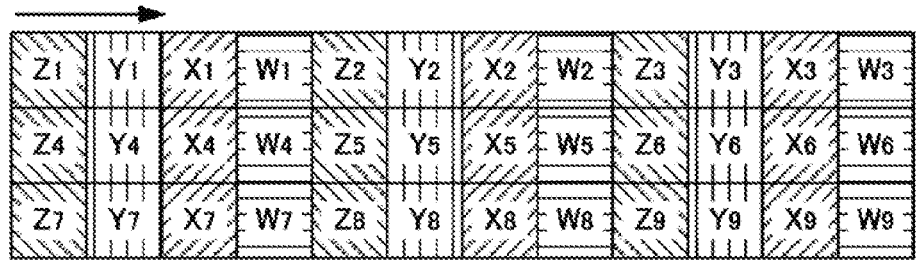
Figures 25A, 25B:
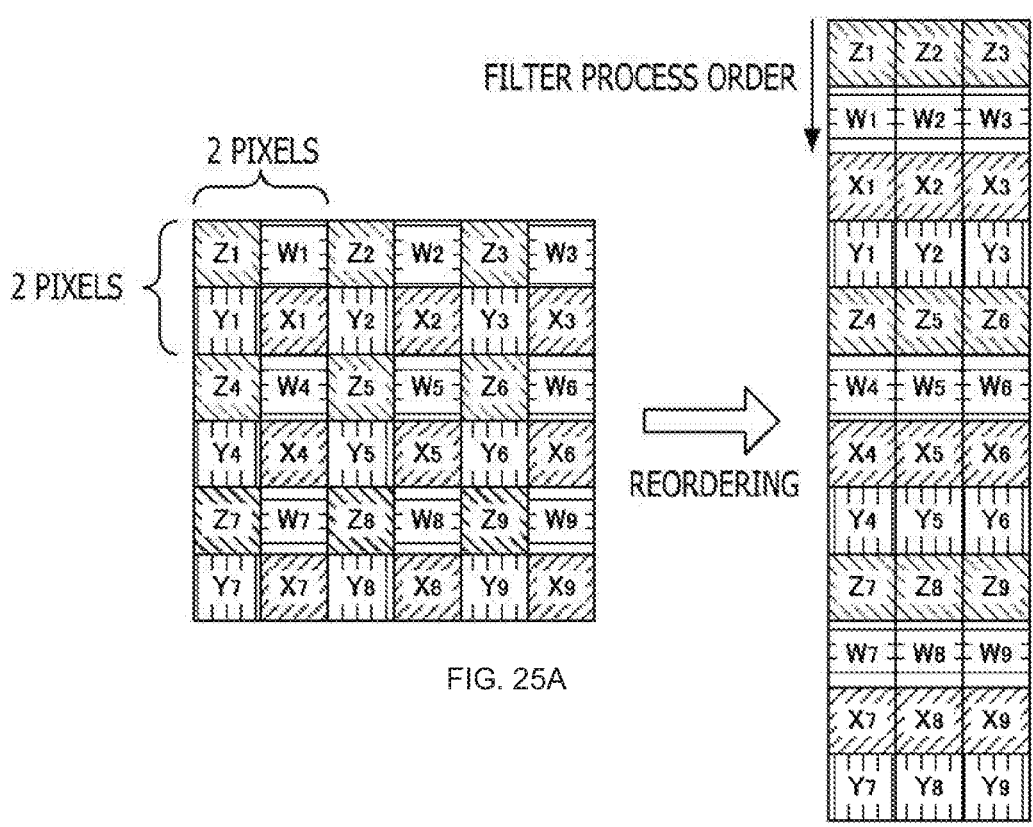
FIGS. 25A and 25B are views illustrating a different example of vertical reordering operation.

Further, the reordering operation in the horizontal direction or the reordering operation in the vertical direction is not limited to that of the order depicted in FIGS. 7A and 7B or 11A and 11B but may be performed such that a spatial order is maintained. FIGS. 24A and 24B depict a different example of the horizontal reordering operation, and FIGS. 25A and 25B depict a different example of the vertical reordering operation. The reordering section 321 reorders pixel signals of the pixel block of 2×2 pixels depicted in FIG. 24A in the horizontal direction. The reordering section 321 reorders pixel signals of a pixel block of 2×2 pixels into pixel signals of a pixel block of 1×4 pixels such that, in reordering in the horizontal direction, it maintains a spatial order in the polarization order in the predetermined rotation direction as depicted in FIG. 24B. In particular, the reordering section 321 reorders pixel signals of a pixel block of 2×2 pixels including polarization pixels W1, X1, Y1 and Z1 into pixel signals of a pixel block of 1×4 pixels such that they have an order of the polarization pixels Z1, Y1, X1 and W1. Further, the reordering section 321 reorders pixel signals of a pixel block of 2×2 pixels including polarization pixels W2, X2, Y2 and Z2 into pixel signals of a pixel block of 1×4 pixels such that they have an order of the polarization pixels Z2, Y2, X2 and W2. Thereafter, pixel signals of a pixel block of 2×2 pixels are reordered into pixel signals of a pixel block of 1×4 pixels in which the spatial order is maintained in the polarization order in the predetermined rotation direction similarly. If reordering is performed in this manner, then when pixel signals of a pixel block of 2×2 pixels are arranged in the horizontal direction, the order of the pixel signals is such that the pixel Z comes to the right side with respect to the pixel W and the pixel Y comes to the right side with respect to the pixel X and the spatial order in the horizontal direction can be maintained. It is to be noted that, in the case of FIG. 7B, the pixel W and the pixel X come to the right side with respect to the pixel Y and the pixel Z and the spatial order is reversed. Accordingly, if the reordering operation in the horizontal direction depicted in FIG. 24B is performed, then the filter process can be performed in a state in which the spatial order in the horizontal direction is maintained.

Further, also in regard to the vertical direction, the reordering section 321 performs reordering such that the spatial order is maintained similarly to that in the horizontal direction. The reordering section 321 reorders pixel signals of a pixel block of 2×2 pixels depicted in FIG. 25A, pixel signals of a pixel block of 2×2 pixels, into pixel signals of a pixel block of 4×1 pixels such that they maintain the spatial order in the polarization order in the predetermined rotation direction as depicted in FIG. 25B. If the reordering is performed in this manner, when the pixel signals of a pixel block of 2×2 pixels are arranged in the vertical direction, the pixel Z comes to the upper side with respect to the pixel Y and the pixel W comes to the upper side with respect to the pixel X and the spatial order in the vertical direction can be maintained. It is to be noted that, in the case of FIG. 11B, the pixel of the pixel Y comes to the upper side with respect to the pixel Z and the spatial order is reversed. Accordingly, if the reordering operation in the vertical direction is performed as depicted in FIG. 25B, then the filter process can be performed in the state in which the spatial order in the vertical direction is maintained.

It is to be noted that, if the pixel signals of a pixel block of 2×2 pixels including the polarization pixels W, X, Y and Z are changed to those in the order of the polarization pixels Y, Z, W and X in the horizontal direction, then the spatial order can be maintained in the polarization order in the rotation direction in which the polarization angle increases similarly as in the case of FIG. 25B. Further, if the pixel signals in a pixel block of 2×2 pixels configured from the polarization pixels W, X, Y and Z are changed to those in the order of the polarization pixels W, Z, Y and X in the vertical direction, then the spatial order can be maintained in the polarization order in the rotation direction in which the polarization angle decreases similarly as in the case of FIG. 24B.

Further, the polarization directions described above are exemplary, and the polarization directions may be directions different from those in the embodiments described hereinabove. Furthermore, if the imaging section uses a color mosaic filter such that, for example, a pixel block of 2×2 pixels is a color unit, then the information processing apparatus 30 can generate a color captured image by a demosaic process using pixel signals of non-polarization pixels in the pixel block. Furthermore, the information processing apparatus 30 can obtain polarization information for each color.

9. Application Examples

The technology according to the present disclosure can be applied to various products. For example, the technology according to the present disclosure may be implemented not only as an information processing terminal but also as an apparatus that is incorporated in any type of moving body such as an automobile, an electric car, a hybrid electric car, a motorcycle, a bicycle, a personal mobility, an airplane, a drone, a ship, a robot, a construction machine or an agricultural machine (tractor).

Figure 26:
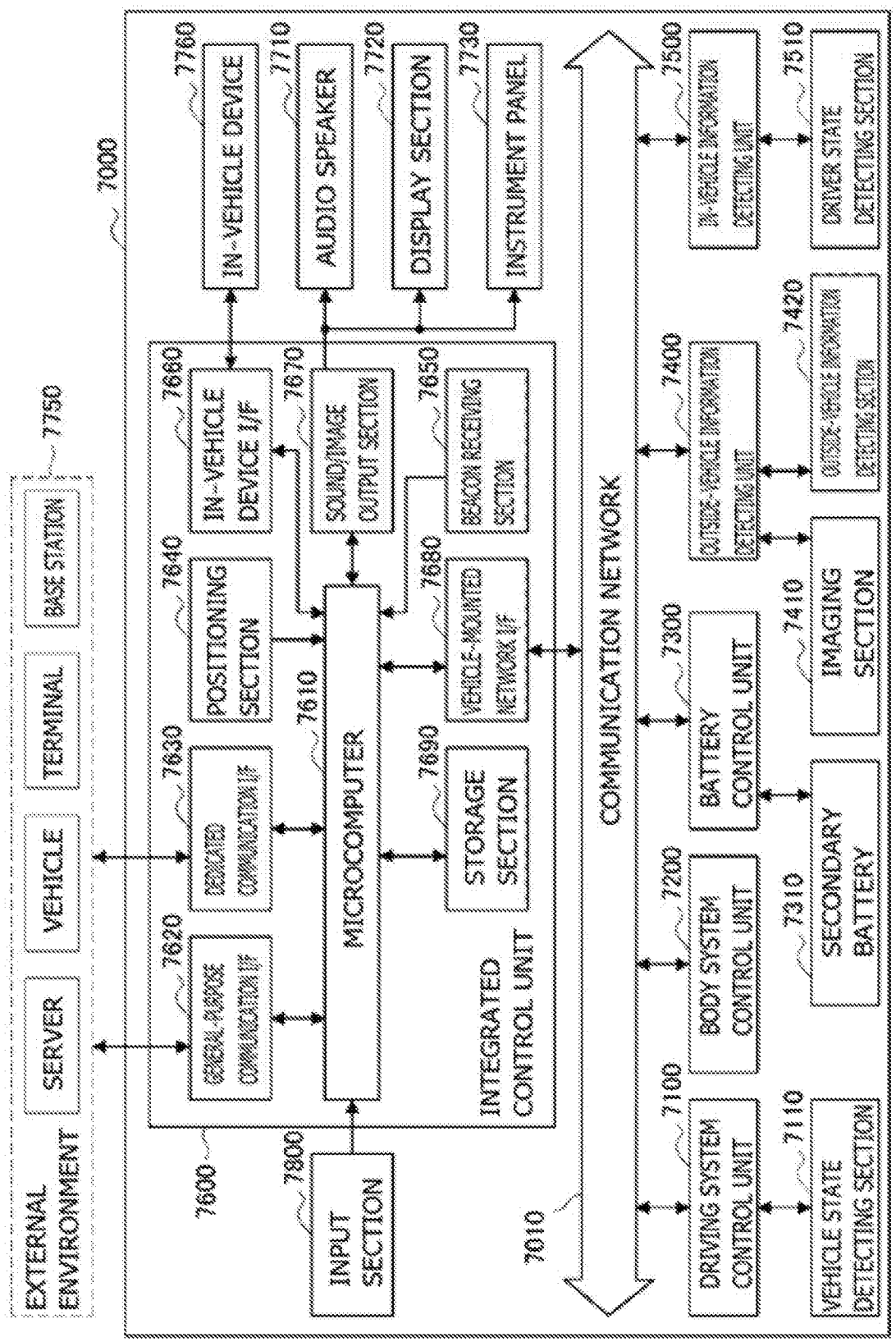
FIG. 26 is a block diagram depicting an example of schematic configuration of a vehicle control system.

FIG. 26 is a block diagram depicting an example of schematic configuration of a vehicle control system 7000 as an example of a mobile body control system to which the technology according to an embodiment of the present disclosure can be applied. The vehicle control system 7000 includes a plurality of electronic control units connected to each other via a communication network 7010. In the example depicted in FIG. 26, the vehicle control system 7000 includes a driving system control unit 7100, a body system control unit 7200, a battery control unit 7300, an outside-vehicle information detecting unit 7400, an in-vehicle information detecting unit 7500, and an integrated control unit 7600. The communication network 7010 connecting the plurality of control units to each other may, for example, be a vehicle-mounted communication network compliant with an arbitrary standard such as controller area network (CAN), local interconnect network (LIN), local area network (LAN), FlexRay, or the like.

Each of the control units includes: a microcomputer that performs arithmetic processing according to various kinds of programs; a storage section that stores the programs executed by the microcomputer, parameters used for various kinds of operations, or the like; and a driving circuit that drives various kinds of control target devices. Each of the control units further includes: a network interface (I/F) for performing communication with other control units via the communication network 7010; and a communication I/F for performing communication with a device, a sensor, or the like within and without the vehicle by wire communication or radio communication. A functional configuration of the integrated control unit 7600 illustrated in FIG. 26 includes a microcomputer 7610, a general-purpose communication I/F 7620, a dedicated communication I/F 7630, a positioning section 7640, a beacon receiving section 7650, an in-vehicle device I/F 7660, a sound/image output section 7670, a vehicle-mounted network I/F 7680, and a storage section 7690. The other control units similarly include a microcomputer, a communication I/F, a storage section, and the like.

The driving system control unit 7100 controls the operation of devices related to the driving system of the vehicle in accordance with various kinds of programs. For example, the driving system control unit 7100 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like. The driving system control unit 7100 may have a function as a control device of an antilock brake system (ABS), electronic stability control (ESC), or the like.

The driving system control unit 7100 is connected with a vehicle state detecting section 7110. The vehicle state detecting section 7110, for example, includes at least one of a gyro sensor that detects the angular velocity of axial rotational movement of a vehicle body, an acceleration sensor that detects the acceleration of the vehicle, and sensors for detecting an amount of operation of an accelerator pedal, an amount of operation of a brake pedal, the steering angle of a steering wheel, an engine speed or the rotational speed of wheels, and the like. The driving system control unit 7100 performs arithmetic processing using a signal input from the vehicle state detecting section 7110, and controls the internal combustion engine, the driving motor, an electric power steering device, the brake device, and the like.

The body system control unit 7200 controls the operation of various kinds of devices provided to the vehicle body in accordance with various kinds of programs. For example, the body system control unit 7200 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 7200. The body system control unit 7200 receives these input radio waves or signals, and controls a door lock device, the power window device, the lamps, or the like of the vehicle.

The battery control unit 7300 controls a secondary battery 7310, which is a power supply source for the driving motor, in accordance with various kinds of programs. For example, the battery control unit 7300 is supplied with information about a battery temperature, a battery output voltage, an amount of charge remaining in the battery, or the like from a battery device including the secondary battery 7310. The battery control unit 7300 performs arithmetic processing using these signals, and performs control for regulating the temperature of the secondary battery 7310 or controls a cooling device provided to the battery device or the like.

The outside-vehicle information detecting unit 7400 detects information about the outside of the vehicle including the vehicle control system 7000. For example, the outside-vehicle information detecting unit 7400 is connected with at least one of an imaging section 7410 and an outside-vehicle information detecting section 7420. The imaging section 7410 includes at least one of a time-of-flight (ToF) camera, a stereo camera, a monocular camera, an infrared camera, and other cameras. The outside-vehicle information detecting section 7420, for example, includes at least one of an environmental sensor for detecting current atmospheric conditions or weather conditions and a peripheral information detecting sensor for detecting another vehicle, an obstacle, a pedestrian, or the like on the periphery of the vehicle including the vehicle control system 7000.

The environmental sensor, for example, may be at least one of a rain drop sensor detecting rain, a fog sensor detecting a fog, a sunshine sensor detecting a degree of sunshine, and a snow sensor detecting a snowfall. The peripheral information detecting sensor may be at least one of an ultrasonic sensor, a radar device, and a LIDAR device (Light detection and Ranging device, or Laser imaging detection and ranging device). Each of the imaging section 7410 and the outside-vehicle information detecting section 7420 may be provided as an independent sensor or device, or may be provided as a device in which a plurality of sensors or devices are integrated.

Figure 27:
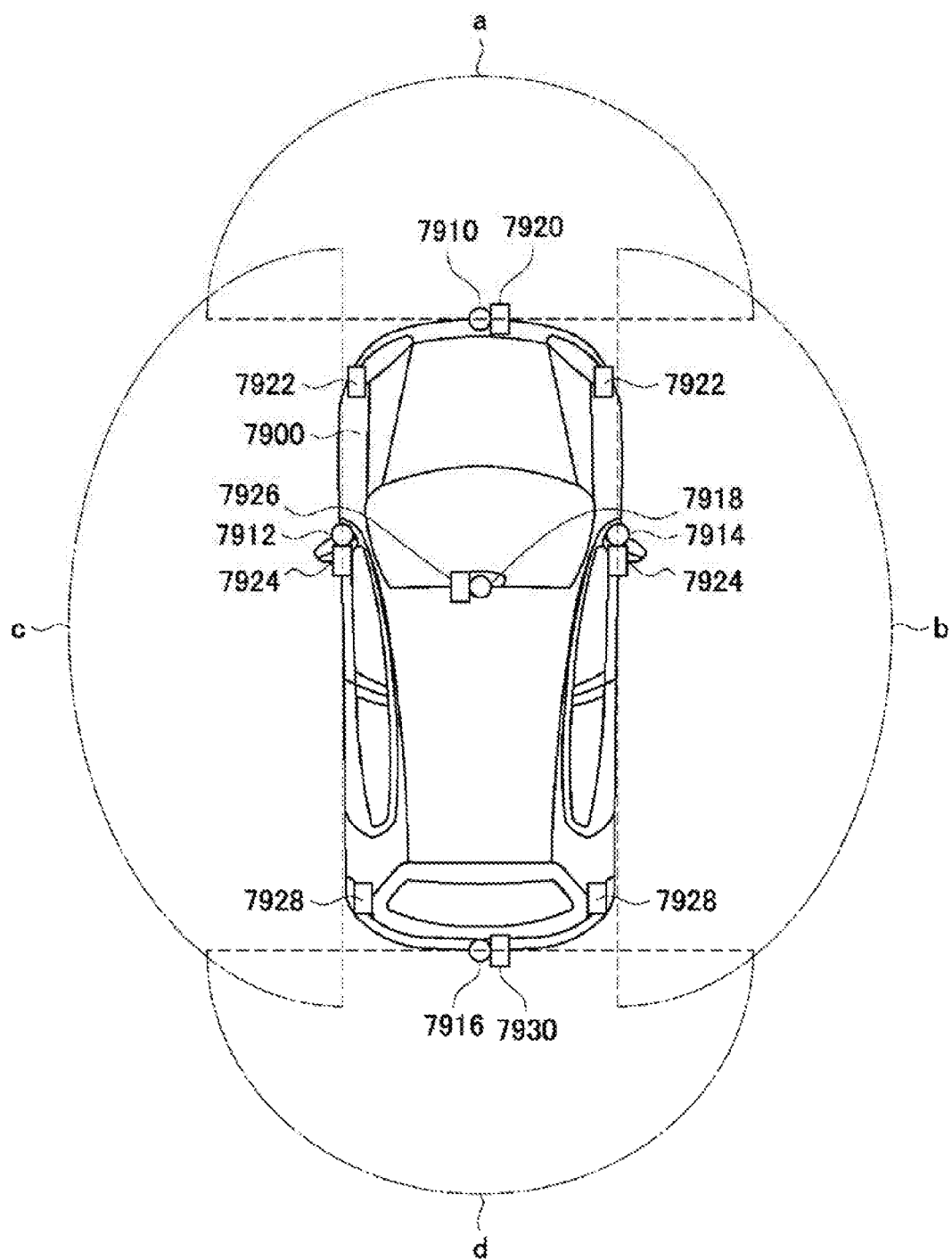
FIG. 27 is a diagram of assistance in explaining an example of installation positions of an outside-vehicle information detecting section and an imaging section.

FIG. 27 depicts an example of installation positions of the imaging section 7410 and the outside-vehicle information detecting section 7420. Imaging sections 7910, 7912, 7914, 7916, and 7918 are, for example, disposed at least one of positions on a front nose, sideview mirrors, a rear bumper, and a back door of the vehicle 7900 and a position on an upper portion of a windshield within the interior of the vehicle. The imaging section 7910 provided to the front nose and the imaging section 7918 provided to the upper portion of the windshield within the interior of the vehicle obtain mainly an image of the front of the vehicle 7900. The imaging sections 7912 and 7914 provided to the sideview mirrors obtain mainly an image of the sides of the vehicle 7900. The imaging section 7916 provided to the rear bumper or the back door obtains mainly an image of the rear of the vehicle 7900. The imaging section 7918 provided to the upper portion of the windshield within the interior of the vehicle is used mainly to detect a preceding vehicle, a pedestrian, an obstacle, a signal, a traffic sign, a lane, or the like.

Incidentally, FIG. 27 depicts an example of photographing ranges of the respective imaging sections 7910, 7912, 7914, and 7916. An imaging range a represents the imaging range of the imaging section 7910 provided to the front nose. Imaging ranges b and c respectively represent the imaging ranges of the imaging sections 7912 and 7914 provided to the sideview mirrors. An imaging range d represents the imaging range of the imaging section 7916 provided to the rear bumper or the back door. A bird's-eye image of the vehicle 7900 as viewed from above can be obtained by superimposing image data imaged by the imaging sections 7910, 7912, 7914, and 7916, for example.

Outside-vehicle information detecting sections 7920, 7922, 7924, 7926, 7928, and 7930 provided to the front, rear, sides, and corners of the vehicle 7900 and the upper portion of the windshield within the interior of the vehicle may be, for example, an ultrasonic sensor or a radar device. The outside-vehicle information detecting sections 7920, 7926, and 7930 provided to the front nose of the vehicle 7900, the rear bumper, the back door of the vehicle 7900, and the upper portion of the windshield within the interior of the vehicle may be a LIDAR device, for example. These outside-vehicle information detecting sections 7920 to 7930 are used mainly to detect a preceding vehicle, a pedestrian, an obstacle, or the like.

Returning to FIG. 26, the description will be continued. The outside-vehicle information detecting unit 7400 makes the imaging section 7410 image an image of the outside of the vehicle, and receives imaged image data. In addition, the outside-vehicle information detecting unit 7400 receives detection information from the outside-vehicle information detecting section 7420 connected to the outside-vehicle information detecting unit 7400. In a case where the outside-vehicle information detecting section 7420 is an ultrasonic sensor, a radar device, or a LIDAR device, the outside-vehicle information detecting unit 7400 transmits an ultrasonic wave, an electromagnetic wave, or the like, and receives information of a received reflected wave. On the basis of the received information, the outside-vehicle information detecting unit 7400 may perform processing of detecting an object such as a human, a vehicle, an obstacle, a sign, a character on a road surface, or the like, or processing of detecting a distance thereto. The outside-vehicle information detecting unit 7400 may perform environment recognition processing of recognizing a rainfall, a fog, road surface conditions, or the like on the basis of the received information. The outside-vehicle information detecting unit 7400 may calculate a distance to an object outside the vehicle on the basis of the received information.

In addition, on the basis of the received image data, the outside-vehicle information detecting unit 7400 may perform image recognition processing of recognizing a human, a vehicle, an obstacle, a sign, a character on a road surface, or the like, or processing of detecting a distance thereto. The outside-vehicle information detecting unit 7400 may subject the received image data to processing such as distortion correction, alignment, or the like, and combine the image data imaged by a plurality of different imaging sections 7410 to generate a bird's-eye image or a panoramic image. The outside-vehicle information detecting unit 7400 may perform viewpoint conversion processing using the image data imaged by the imaging section 7410 including the different imaging parts.

The in-vehicle information detecting unit 7500 detects information about the inside of the vehicle. The in-vehicle information detecting unit 7500 is, for example, connected with a driver state detecting section 7510 that detects the state of a driver. The driver state detecting section 7510 may include a camera that images the driver, a biosensor that detects biological information of the driver, a microphone that collects sound within the interior of the vehicle, or the like. The biosensor is, for example, disposed in a seat surface, the steering wheel, or the like, and detects biological information of an occupant sitting in a seat or the driver holding the steering wheel. On the basis of detection information input from the driver state detecting section 7510, the in-vehicle information detecting unit 7500 may calculate a degree of fatigue of the driver or a degree of concentration of the driver, or may determine whether the driver is dozing. The in-vehicle information detecting unit 7500 may subject an audio signal obtained by the collection of the sound to processing such as noise canceling processing or the like.

The integrated control unit 7600 controls general operation within the vehicle control system 7000 in accordance with various kinds of programs. The integrated control unit 7600 is connected with an input section 7800. The input section 7800 is implemented by a device capable of input operation by an occupant, such, for example, as a touch panel, a button, a microphone, a switch, a lever, or the like. The integrated control unit 7600 may be supplied with data obtained by voice recognition of voice input through the microphone. The input section 7800 may, for example, be a remote control device using infrared rays or other radio waves, or an external connecting device such as a mobile telephone, a personal digital assistant (PDA), or the like that supports operation of the vehicle control system 7000. The input section 7800 may be, for example, a camera. In that case, an occupant can input information by gesture. Alternatively, data may be input which is obtained by detecting the movement of a wearable device that an occupant wears. Further, the input section 7800 may, for example, include an input control circuit or the like that generates an input signal on the basis of information input by an occupant or the like using the above-described input section 7800, and which outputs the generated input signal to the integrated control unit 7600. An occupant or the like inputs various kinds of data or gives an instruction for processing operation to the vehicle control system 7000 by operating the input section 7800.

The storage section 7690 may include a read only memory (ROM) that stores various kinds of programs executed by the microcomputer and a random access memory (RAM) that stores various kinds of parameters, operation results, sensor values, or the like. In addition, the storage section 7690 may be implemented by a magnetic storage device such as a hard disc drive (HDD) or the like, a semiconductor storage device, an optical storage device, a magneto-optical storage device, or the like.

The general-purpose communication I/F 7620 is a communication I/F used widely, which communication I/F mediates communication with various apparatuses present in an external environment 7750. The general-purpose communication I/F 7620 may implement a cellular communication protocol such as global system for mobile communications (GSM), worldwide interoperability for microwave access (WiMAX), long term evolution (LTE)), LTE-advanced (LTE-A), or the like, or another wireless communication protocol such as wireless LAN (referred to also as wireless fidelity (Wi-Fi), Bluetooth, or the like. The general-purpose communication I/F 7620 may, for example, connect to an apparatus (for example, an application server or a control server) present on an external network (for example, the Internet, a cloud network, or a company-specific network) via a base station or an access point. In addition, the general-purpose communication I/F 7620 may connect to a terminal present in the vicinity of the vehicle (which terminal is, for example, a terminal of the driver, a pedestrian, or a store, or a machine type communication (MTC) terminal) using a peer to peer (P2P) technology, for example.

The dedicated communication I/F 7630 is a communication I/F that supports a communication protocol developed for use in vehicles. The dedicated communication I/F 7630 may implement a standard protocol such, for example, as wireless access in vehicle environment (WAVE), which is a combination of institute of electrical and electronic engineers (IEEE) 802.11p as a lower layer and IEEE 1609 as a higher layer, dedicated short range communications (DSRC), or a cellular communication protocol. The dedicated communication I/F 7630 typically carries out V2X communication as a concept including one or more of communication between a vehicle and a vehicle (Vehicle to Vehicle), communication between a road and a vehicle (Vehicle to Infrastructure), communication between a vehicle and a home (Vehicle to Home), and communication between a pedestrian and a vehicle (Vehicle to Pedestrian).

The positioning section 7640, for example, performs positioning by receiving a global navigation satellite system (GNSS) signal from a GNSS satellite (for example, a GPS signal from a global positioning system (GPS) satellite), and generates positional information including the latitude, longitude, and altitude of the vehicle. Incidentally, the positioning section 7640 may identify a current position by exchanging signals with a wireless access point, or may obtain the positional information from a terminal such as a mobile telephone, a personal handyphone system (PHS), or a smart phone that has a positioning function.

The beacon receiving section 7650, for example, receives a radio wave or an electromagnetic wave transmitted from a radio station installed on a road or the like, and thereby obtains information about the current position, congestion, a closed road, a necessary time, or the like. Incidentally, the function of the beacon receiving section 7650 may be included in the dedicated communication I/F 7630 described above.

The in-vehicle device I/F 7660 is a communication interface that mediates connection between the microcomputer 7610 and various in-vehicle devices 7760 present within the vehicle. The in-vehicle device I/F 7660 may establish wireless connection using a wireless communication protocol such as wireless LAN, Bluetooth, near field communication (NFC), or wireless universal serial bus (WUSB). In addition, the in-vehicle device I/F 7660 may establish wired connection by universal serial bus (USB), high-definition multimedia interface (HDMI), mobile high-definition link (MHL), or the like via a connection terminal (and a cable if necessary) not depicted in the figures. The in-vehicle devices 7760 may, for example, include at least one of a mobile device and a wearable device possessed by an occupant and an information device carried into or attached to the vehicle. The in-vehicle devices 7760 may also include a navigation device that searches for a path to an arbitrary destination. The in-vehicle device I/F 7660 exchanges control signals or data signals with these in-vehicle devices 7760.

The vehicle-mounted network I/F 7680 is an interface that mediates communication between the microcomputer 7610 and the communication network 7010. The vehicle-mounted network I/F 7680 transmits and receives signals or the like in conformity with a predetermined protocol supported by the communication network 7010.

The microcomputer 7610 of the integrated control unit 7600 controls the vehicle control system 7000 in accordance with various kinds of programs on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. For example, the microcomputer 7610 may calculate a control target value for the driving force generating device, the steering mechanism, or the braking device on the basis of the obtained information about the inside and outside of the vehicle, and output a control command to the driving system control unit 7100. For example, the microcomputer 7610 may perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like. In addition, the microcomputer 7610 may perform cooperative control intended for automatic driving, which makes the vehicle to travel autonomously without depending on the operation of the driver, or the like, by controlling the driving force generating device, the steering mechanism, the braking device, or the like on the basis of the obtained information about the surroundings of the vehicle.

The microcomputer 7610 may generate three-dimensional distance information between the vehicle and an object such as a surrounding structure, a person, or the like, and generate local map information including information about the surroundings of the current position of the vehicle, on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. In addition, the microcomputer 7610 may predict danger such as collision of the vehicle, approaching of a pedestrian or the like, an entry to a closed road, or the like on the basis of the obtained information, and generate a warning signal. The warning signal may, for example, be a signal for producing a warning sound or lighting a warning lamp.

The sound/image output section 7670 transmits an output signal of at least one of a sound and an image to an output device capable of visually or auditorily notifying information to an occupant of the vehicle or the outside of the vehicle. In the example of FIG. 26, an audio speaker 7710, a display section 7720, and an instrument panel 7730 are illustrated as the output device. The display section 7720 may, for example, include at least one of an on-board display and a head-up display. The display section 7720 may have an augmented reality (AR) display function. The output device may be other than these devices, and may be another device such as headphones, a wearable device such as an eyeglass type display worn by an occupant or the like, a projector, a lamp, or the like. In a case where the output device is a display device, the display device visually displays results obtained by various kinds of processing performed by the microcomputer 7610 or information received from another control unit in various forms such as text, an image, a table, a graph, or the like. In addition, in a case where the output device is an audio output device, the audio output device converts an audio signal constituted of reproduced audio data or sound data or the like into an analog signal, and auditorily outputs the analog signal.

Incidentally, at least two control units connected to each other via the communication network 7010 in the example depicted in FIG. 26 may be integrated into one control unit. Alternatively, each individual control unit may include a plurality of control units. Further, the vehicle control system 7000 may include another control unit not depicted in the figures. In addition, part or the whole of the functions performed by one of the control units in the above description may be assigned to another control unit. That is, predetermined arithmetic processing may be performed by any of the control units as long as information is transmitted and received via the communication network 7010. Similarly, a sensor or a device connected to one of the control units may be connected to another control unit, and a plurality of control units may mutually transmit and receive detection information via the communication network 7010.

In the imaging sections 7410, 7910, 7912, 7914, 7916 and 7918 in the vehicle control system 7000, the imaging section that images an acquisition range of polarization information is configured such that any of the imaging section of the embodiment described hereinabove is used. Further, the information processing apparatus 30 may be provided in the integrated control unit 7600 in the application example depicted in FIG. 26 or may be provided integrally with the imaging section. Since such a configuration as just described makes it possible to acquire polarization information from which noise and so forth are removed from a captured image generated by the imaging section that images an acquisition range of polarization information, the acquired polarization information can be utilized for driving support, operation control and so forth. It is to be noted that the information processing apparatus 30 may be implemented in a module for the integrated control unit 7600 depicted in FIG. 26 (for example, in an integrated circuit module configured from one die). Further, the configuration of the vehicle control system 7000 is an example, and also a configuration that does not include part of the blocks depicted in FIG. 26 may be applied or a configuration that includes a block that is not depicted in FIG. 26 may be applied.

While the series of processes described in the specification can be executed by hardware, it can otherwise be executed by software or by a composite configuration of hardware and software. In the case where processes by software are executed, a program that records the processing sequence is installed into a memory of a computer and executed. As an alternative, it is possible to install the program into a computer for universal use that can execute various processes such that the program is executed.

For example, it is possible to record the program into a hard disk, an SSD (Solid State Drive) or a ROM (Read Only Memory) as a recording medium. As an alternative, it is possible to temporarily or permanently store (record) the program into a removable recording medium such as a flexible disk, a CD-ROM (Compact Disc Read Only Memory), an MO (Magneto optical) disk, a DVD (Digital Versatile Disc), a BD (Blu-ray Disc (registered trademark)), a magnetic disk or a semiconductor memory. Such a removable recording medium as just described can be provided as so-called package software.

Further, the program not only can be installed from a removable recording medium into a computer but also can be transferred by wireless or wired transfer from a download site to a computer through a network such as a LAN (Local Area Network) or the Internet. The computer can receive the program transferred thereto in this manner and install the program into a recording medium such as a built-in hard disk.

It is to be noted that the advantageous effects described in the present specification are exemplary to the last and are not restrictive, and additional advantageous effects not described in the present specification may be applicable. Further, the present technology shall not be interpreted restrictively to the embodiments of the present technology described above. The embodiments of the present technology disclose the present technology in the form of exemplification and it is apparent that those skilled in the art can perform modification or substitution of the embodiments without departing from the subject matter of the present technology. In short, the claims should be referred to in order to decide the subject matter of the present technology.

Also, it is possible for the information processing apparatus of the present disclosure to assume such configurations as described below.

(1) An information processing apparatus including:
a filter processing section configured to use pixel signals of a polarization image generated by an imaging apparatus in which polarization pixels with a plurality of polarization directions are provided in a given array to extract polarization components by a filter process of the pixel signals arranged in a polarization order in a given rotation direction.

(2) The information processing apparatus according to (1), further including:
a reordering section configured to rearrange the pixel signals into an array in which a horizontal direction or a vertical direction is the polarization order in the given rotation direction; and in which the filter processing section performs the filter process using the pixel signals rearranged by the reordering section.

(3) The information processing apparatus according to (2), in which
the reordering section performs rearrangement of pixel signals of a polarization image generated by the imaging apparatus into an array in which one of the horizontal direction or the vertical direction is the polarization order in the given rotation direction and rearrangement of the pixel signals filter processed by the filter processing section into an array in which the other of the horizontal direction or the vertical direction is the polarization order in the given rotation direction; and
the filter processing section performs the filter process for the pixel signals for which the rearrangement in the one direction is performed and the filter process for the pixel signals after the filter process for which the rearrangement in the other direction is performed by the reordering section.

(4) The information processing apparatus according to (2) or (3), in which the imaging apparatus repetitively provides pixel blocks including polarization pixels with the plurality of polarization directions such that the polarization pixels with the plurality of polarization directions are arranged in the given array; and the reordering section rearranges the pixel signals in the pixel block into an array in which the horizontal direction or the vertical direction is the polarization order in the given rotation direction.

(5) The information processing apparatus according to any one of (2) to (4), in which the imaging apparatus has polarization pixels with the plurality of polarization directions and non-polarization pixels; and the reordering section rearranges the pixel signals of the polarization pixels except the pixel signals of the non-polarization pixels into an array in which the horizontal direction or the vertical direction is the polarization order in the given rotation direction.

(6) The information processing apparatus according to any one of (2) to (5), in which the imaging apparatus includes polarization pixels that have four polarization directions having angular differences equal to each other therebetween and are provided in the given array;

the reordering section rearranges the pixel signals of the polarization image generated by the imaging apparatus into an array in which the horizontal direction or the vertical direction is the polarization order in the given rotation direction and then distributes the pixel signals alternately for each pixel to generate two pixel signal groups; and the filter processing section performs the filter process for each of the pixel signal groups generated by the reordering section.

(7) The information processing apparatus according to any one of (2) to (6), further including an array restoration section configured to return the pixel signals filter processed by the filter processing section into an array before the rearrangement is performed by the reordering section.

(8) The information processing apparatus according to any one of (1) to (7), in which the filter processing section extracts signal components that vary in response to a polarization cycle from the pixel signals arranged in the polarization order in the given rotation direction as the polarization components.

Meanwhile, the imaging apparatus of the present technology can assume such configurations as described below as well.

(1) An imaging apparatus, in which polarization pixels with a plurality of polarization directions are provided in a polarization order in a given rotation direction in at least one of a horizontal direction or a vertical direction.

(2) The imaging apparatus according to (1), in which a polarization pixel group adjacent to a polarization pixel group in which the image signals are arranged in the polarization order of the given rotation direction in the horizontal direction or the vertical direction has a polarization order in an opposite rotation direction.

(3) The imaging apparatus according to (1) or (2), in which, the polarization pixels arranged in the polarization order in the given rotation direction have polarization directions that have angular differences equal to each other between the polarization pixels.

INDUSTRIAL APPLICABILITY

With the information processing apparatus, information processing method and program of the present technology, pixel signals of a polarization image generated by an imaging apparatus, in which polarization pixels with a plurality of polarization directions are provided repetitively in a given array, are used to perform a filter process of the image signals arranged in a polarization order in a predetermined rotation direction to extract polarization components. Further, with the imaging apparatus of the present technology, polarization pixels with a plurality of polarization directions are provided in a polarization order in a predetermined rotation direction in at least one of a horizontal direction or a vertical direction. Therefore, polarization information indicative of polarization components that vary in response to a polarization cycle can be acquired with high accuracy. Accordingly, the present technology is suitable for equipment that performs reflection removal, shape estimation or the like using polarization images.

REFERENCE SIGNS LIST

10 . . . Polarization information acquisition system
20 . . . Polarization camera
21 . . . Imaging optical system
22, 22-1, 22-2a, 22-2b, 22-3a, 22-3b, 22-3c, 22-4 . . . Imaging section
25, 60 . . . Information recording and reproduction apparatus
30 . . . Information processing apparatus
31 . . . Reception buffer
32, 32-1, 32-2, 32-3, 32-4, 32-5 . . . Filter section
33 . . . Memory section
34 . . . Filter coefficient storage section
35 . . . Transmission buffer
50 . . . Polarization information utilization section
321 . . . Reordering section
322 . . . Filter processing section
323 . . . Array restoration section

The invention claimed is:

1. An information processing apparatus, comprising:
circuitry configured to:
use a plurality of pixel signals of a polarization image generated by an imaging apparatus in which a plurality of polarization pixels with a plurality of polarization directions are provided in a first array to extract polarization components by a filter process of the plurality of pixel signals arranged in a polarization order in a rotation direction;
rearrange the plurality of pixel signals into a second array in which one of a horizontal direction or a vertical direction is the polarization order in the rotation direction; and
apply the filter process based on the plurality of rearranged pixel signals.

2. The information processing apparatus according to claim 1, wherein the circuitry is further configured to:
rearrange the plurality of pixel signals of the polarization image generated by the imaging apparatus into a third array in which one of the horizontal direction or the vertical direction is the polarization order in the rotation direction;
rearrange the filter processed plurality of pixel signals into a fourth array in which the other of the horizontal direction or the vertical direction is the polarization order in the rotation direction; and
apply the filter process for one of the plurality of pixel signals for which the rearrangement in the one of the horizontal direction or the vertical direction is performed, or the plurality of pixel signals after the filter process for which the rearrangement in the other direction is performed.

3. The information processing apparatus according to claim 1, wherein
the imaging apparatus is configured to repetitively provide at least one pixel block including the plurality of polarization pixels with the plurality of polarization directions such that the plurality of polarization pixels with the plurality of polarization directions are arranged in the first array; and
the circuitry is further configured to rearrange the plurality of pixel signals in the at least one pixel block into the second array in which one of the horizontal direction or the vertical direction is the polarization order in the rotation direction.

4. The information processing apparatus according to claim 1, wherein
the imaging apparatus comprises the plurality of polarization pixels with the plurality of polarization directions and a plurality of non-polarization pixels; and
the circuitry is further configured to rearrange the plurality of pixel signals of the plurality of polarization pixels except the plurality of pixel signals of the plurality of non-polarization pixels into the second array in which one of the horizontal direction or the vertical direction is the polarization order in the rotation direction.

5. The information processing apparatus according to claim 1, wherein
the imaging apparatus includes the plurality of polarization pixels, provided in the first array, that have four polarization directions having angular differences equal to each other;
the circuitry is further configured to:
rearrange the plurality of pixel signals of the polarization image generated by the imaging apparatus into the second array in which one of the horizontal direction or the vertical direction is the polarization order in the rotation direction;
distribute the plurality of pixel signals alternately for each pixel of a plurality of pixels to generate two pixel signal groups; and
apply the filter process for each of the generated pixel signal groups.

6. The information processing apparatus according to claim 1, wherein the circuitry is further configured to return the plurality of filter processed pixel signals into the first array before the rearrangement.

7. The information processing apparatus according to claim 1, wherein the circuitry is further configured to extract a plurality of signal components that vary in response to a polarization cycle from the plurality of pixel signals arranged in the polarization order in the rotation direction as the polarization components.

8. An information processing method, comprising:
using a plurality of pixel signals of a polarization image generated by an imaging apparatus in which a plurality of polarization pixels with a plurality of polarization directions are provided in a first array to extract a plurality of polarization components by a filtering process of the plurality of pixel signals arranged in a polarization order in a rotation direction;
rearranging the plurality of pixel signals into a second array in which one of a horizontal direction or a vertical direction is the polarization order in the rotation direction; and
applying the filtering process based on the plurality of rearranged pixel signals.

9. A non-transitory computer-readable medium having stored thereon computer-executable instructions which, when executed by a processor, cause the processor to execute operations, the operations comprising:
using a plurality of pixel signals of a polarization image generated by an imaging apparatus in which a plurality of polarization pixels with a plurality of polarization directions are provided in a first array to extract polarization components by a filter process of the plurality of pixel signals arranged in a polarization order in a rotation direction;
rearranging the plurality of pixel signals into a second array in which one of a horizontal direction or a vertical direction is the polarization order in the rotation direction; and
applying the filtering process based on the plurality of rearranged pixel signals.

10. An imaging apparatus, comprising a plurality of polarization pixels with a plurality of polarization directions in a polarization order in a rotation direction in at least one of a horizontal direction or a vertical direction; and
a first polarization pixel group, adjacent to a second polarization pixel group, in which a plurality of image signals are arranged in the polarization order of the rotation direction in one of the horizontal direction or the vertical direction, wherein
the plurality of image signals is associated with a polarization image, and
the polarization order in the horizontal direction has opposite rotation direction with respect to the polarization order in the vertical direction.

11. The imaging apparatus according to claim 10, wherein the plurality of polarization pixels arranged in the polarization order in the rotation direction have a plurality of polarization directions that have angular differences equal to each other.

* * * * *